(12) United States Patent
Nogawa

(10) Patent No.: US 10,437,823 B2
(45) Date of Patent: Oct. 8, 2019

(54) HANDWRITTEN CONTENTS AGGREGATION DEVICE AND NON-TRANSITORY COMPUTER-READABLE RECORDING MEDIUM

(71) Applicant: KONICA MINOLTA, INC., Chiyoda-ku, Tokyo (JP)

(72) Inventor: Tetsuren Nogawa, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 581 days.

(21) Appl. No.: 15/210,956

(22) Filed: Jul. 15, 2016

(65) Prior Publication Data

US 2017/0060954 A1 Mar. 2, 2017

(30) Foreign Application Priority Data

Aug. 26, 2015 (JP) ................................ 2015-166900

(51) Int. Cl.
*G06F 16/20* (2019.01)
*G06F 16/2455* (2019.01)
*G06K 9/00* (2006.01)
*G06F 17/22* (2006.01)
(Continued)

(52) U.S. Cl.
CPC ...... *G06F 16/24556* (2019.01); *G06F 16/258* (2019.01); *G06F 17/2211* (2013.01); *G06F 17/2229* (2013.01); *G06F 17/2241* (2013.01); *G06F 17/2288* (2013.01); *G06F 17/242* (2013.01); *G06K 9/00463* (2013.01); *G06K 9/00442* (2013.01)

(58) Field of Classification Search
None
See application file for complete search history.

(56) References Cited

U.S. PATENT DOCUMENTS

| 7,405,841 | B2 | 7/2008 | Takenouchi | |
| 2011/0057884 | A1* | 3/2011 | Gormish | G06F 9/54 345/173 |
| 2011/0060981 | A1 | 3/2011 | Piersol et al. | |

FOREIGN PATENT DOCUMENTS

| JP | 2005-074724 A | 3/2005 |
| JP | 2005-223863 A | 8/2005 |
| JP | 2007325196 A | 12/2007 |

(Continued)

OTHER PUBLICATIONS

Decision to Decline the Amendment issued in corresponding Japanese Patent Application No. 2015-166900, dated Jul. 17, 2018, with English Translation (9 pages).

(Continued)

*Primary Examiner* — Belix M Ortiz Ditren
(74) *Attorney, Agent, or Firm* — Buchanan Ingersoll & Rooney PC

(57) ABSTRACT

Disclosed is a handwritten contents aggregation device including: an obtaining unit configured to obtain a first file and a second file in each of which written information indicating handwritten contents is added to a same original file; and a processor configured to: analyze the first file and the second file and extract the written information from the first file and the second file, prepare a third file by aggregating the written information extracted from the first file and the written information extracted from the second file in the original file, and output the third file.

14 Claims, 25 Drawing Sheets

(51) Int. Cl.
*G06F 16/25* (2019.01)
*G06F 17/24* (2006.01)

(56) References Cited

FOREIGN PATENT DOCUMENTS

| | | |
|---|---|---|
| JP | 2010251919 A | 11/2010 |
| JP | 2011-060286 A | 3/2011 |
| JP | 2011-060287 A | 3/2011 |
| JP | 2014003489 A | 1/2014 |
| JP | 2014146081 A | 8/2014 |

OTHER PUBLICATIONS

Office Action (Report of Reconsideration by Examiner before Appeal) dated Dec. 4, 2018, by the Japanese Patent Office in corresponding Japanese Patent Application No. 2015-166900, and an English Translation of the Office Action. (6 pages).

Office Action (Notice of Reason for Refusal) dated Mar. 6, 2018, by the Japanese Patent Office in corresponding Japanese Patent Application No. 2015-166900, and an English Translation of the Office Action. (15 pages).

Office Action (Notice of Reason for Refusal) dated Aug. 15, 2017, by the Japanese Patent Office in Japanese Patent Application No. 2015-166900, and an English Translation of the Office Action. (16 pages).

Office Action (Notification of Reasens for Refusal) dated Aug. 6, 2019, by the Japanese Patent Office in corresponding Japanese Patent Application No. 2015-166990, and an English Translation of the Office Action. (13 pages).

\* cited by examiner

FIG.17

PRINT FORMAT SELECTION

● AGGREGATION IN ONE PAGE
○ NO AGGREGATION IN ONE PAGE
  ○ SLIDES INCLUDING WRITTEN INFORMATION ARE PRINTED IN THE SAME PAGE
  ○ SLIDES INCLUDING WRITTEN INFORMATION ARE NOT PRINTED IN THE SAME PAGE

FIG.23
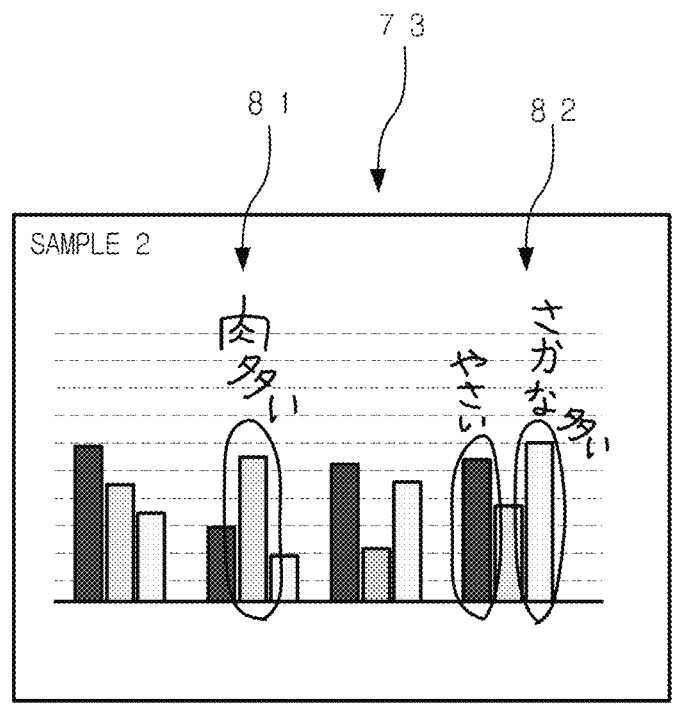
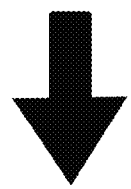
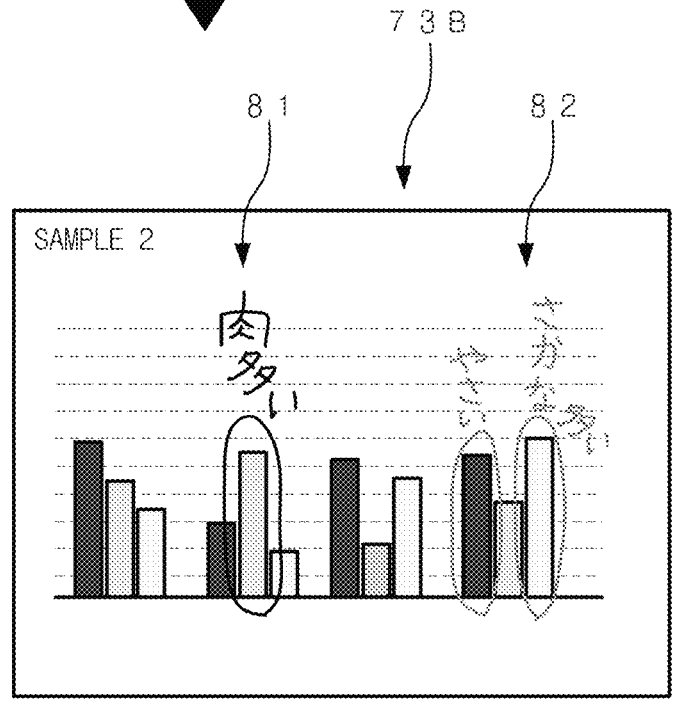

HANDWRITTEN CONTENTS AGGREGATION DEVICE AND NON-TRANSITORY COMPUTER-READABLE RECORDING MEDIUM

BACKGROUND OF THE INVENTION

Field of the Invention

The present invention relates to a handwritten contents aggregation device and a non-transitory computer-readable recording medium for aggregating the handwritten contents added in a plurality of devices.

Description of Related Art

An information viewing device which can add characters or figures in handwriting to the document which is currently displayed is popularized. In recent years, the above information viewing device is commonly used in a conference or the like. For example, the above information viewing device is used in a conference as follows.

In a conference, in case that the presentation is conducted by using slides prepared by Power Point®, each participant takes the above information viewing device in which the file to be used in the presentation is stored and listens to the presentation while the slides of the stored file are displayed by the information viewing device. Each participant adds a note, such as a point that the participant noticed about the presentation or the like, in handwriting to a slide which is currently displayed by the participant's information viewing device.

After the presentation is finished, there are some cases in which some participants want to aggregate the handwritten contents which are added to the file (slide) of the presentation by each participant. However, because the contents added by each participant are managed in each file which is stored in the participant's information viewing device, a troublesome task for aggregating the above contents is caused.

In Japanese Patent Application Publications No. 2005-223863 and No. 2005-74724, the method for managing the handwritten contents is disclosed. However, in Japanese Patent Application Publications No. 2005-223863 and No. 2005-74724, the handwritten contents are added to paper media, and the handwritten contents are not aggregated. The above publications are not relevant to the aggregation of the handwritten contents which are added to the electronic file.

SUMMARY

To achieve at least one of the abovementioned objects, a handwritten contents aggregation device reflecting one aspect of the present invention, comprises:

an obtaining unit configured to obtain a first file and a second file in each of which written information indicating handwritten contents is added to a same original file; and a processor configured to:

analyze the first file and the second file and extract the written information from the first file and the second file, prepare a third file by aggregating the written information extracted from the first file and the written information extracted from the second file in the original file, and output the third file.

Preferably, when the original file includes the written information indicating the handwritten contents, the processor prepares the third file by aggregating a difference between the written information included in the original file and the written information extracted from the first file, and a difference between the written information included in the original file and the written information extracted from the second file, in the original file.

Preferably, the processor prepares the third file in which the first file is related to the written information extracted from the first file and the second file is related to the written information extracted from the second file.

Preferably, the obtaining unit compares a file name of a file stored in a predetermined area with a file name of the original file, and obtains the file having the file name including the file name of the original file as the first file or the second file.

Preferably, the processor prepares the third file by aggregating the handwritten contents added in one page of the first file and the handwritten contents added in the one page of the second file, in the one page of the original file.

Preferably, the processor prepares the third file including a page of the first file, in which the handwritten contents are added, and a page of the second file, in which the handwritten contents are added.

Preferably, in a case that the handwritten contents added in the one page of the first file and the handwritten contents added in the one page of the second file are aggregated in the one page of the original file without changing each position of the handwritten contents in the one page, when an overlapping area in which the handwritten contents added in the one page of the first file are overlapped with the handwritten contents added in the one page of the second file is not less than a predetermined area, the processor prepares the third file by changing the position of the handwritten contents in the one page so as to reduce the overlapping area.

Preferably, in a case that the handwritten contents added in the one page of the first file and the handwritten contents added in the one page of the second file are aggregated in the one page of the original file without changing each position of the handwritten contents in the one page, when an overlapping area in which the handwritten contents added in the one page of the first file are overlapped with the handwritten contents added in the one page of the second file is not less than a predetermined area, the processor prepares the third file including the one page of the first file and the one page of the second file.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 17 is a view showing the window for selecting one of the output files in Examples 1 to 3;

FIG. 23 is a view showing the situation in which the output file is prepared so as to aggregate the written information in different line colors;

DETAILED DESCRIPTION OF PREFERRED EMBODIMENT

Hereinafter, a preferred embodiment of the present invention will be explained with reference to the accompanying drawings.

Figure 1:
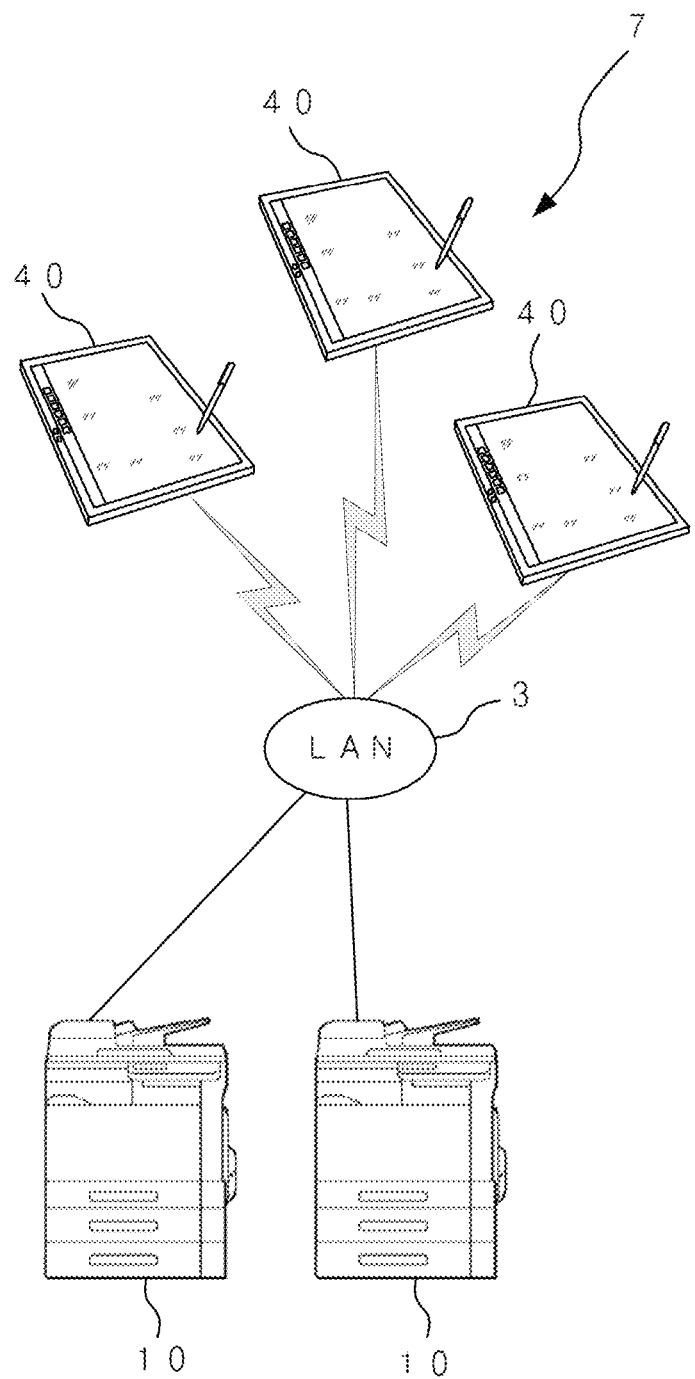
FIG. 1 is a view showing the handwritten contents aggregation system according to the embodiment.

FIG. 1 shows the handwritten contents aggregation system 7 including the tablet PCs 40 having the function as the handwritten contents aggregation device according to the embodiment.

The handwritten contents aggregation system 7 comprises a plurality of (in this embodiment, three) tablet PCs 40 and at least one (in this embodiment, two) image forming apparatus 10 for printing an image in accordance with the print data output from one of the tablet PCs 40 so as to communicably connect them via the network, such as the LAN (Local Area Network) 3.

The image forming apparatus 10 is a so-called multi function peripheral which has the function for executing jobs, such as a copy job for printing an image of an original on a recording sheet by optically reading the original, a scan job for storing the image data of the read original as a file (scanned image), a print job for printing out an image on a recording sheet in accordance with the print data transmitted from the tablet PC 40, and the like.

The tablet PC 40 is a so-called portable information processing terminal having a touch panel which functions as the screen. The tablet PC 40 can prepare a document file or the like, and edit the file, for example, add the handwritten contents or the like in the file. In this embodiment, firstly, one of the tablet PCs 40 distributes the original file which is an OOXML file, to the other two tablets PCs 40. In each of the other two tablets PCs 40 which receive the original file, the handwritten contents are added in the original file. Then, each of the other two tablets PCs 40 stores the file in which the handwritten contents are added (referred to as the first file and the second file, respectively) in the predetermined folder provided in the tablet PC 40 which distributes the original file.

The tablet PC 40 which distributes the original file (hereinafter, referred to as the aggregation tablet PC) analyzes the first file and the second file stored in the above folder, and extracts the written information indicating the handwritten contents. Then, the aggregation tablet PC 40 prepares the aggregation file in which the written information extracted from the first file and the second file is aggregated in the original file. Further, the aggregation tablet PC 40 prepares the output file having the format for the display data or the print data in accordance with the aggregation file, and outputs the prepared output file to an external device, such as the image forming apparatus 10. As described above, the aggregation tablet PC 40 aggregates the handwritten contents which are added in the original file stored in each of the other tablet PCs 40, in one file.

Figure 2:
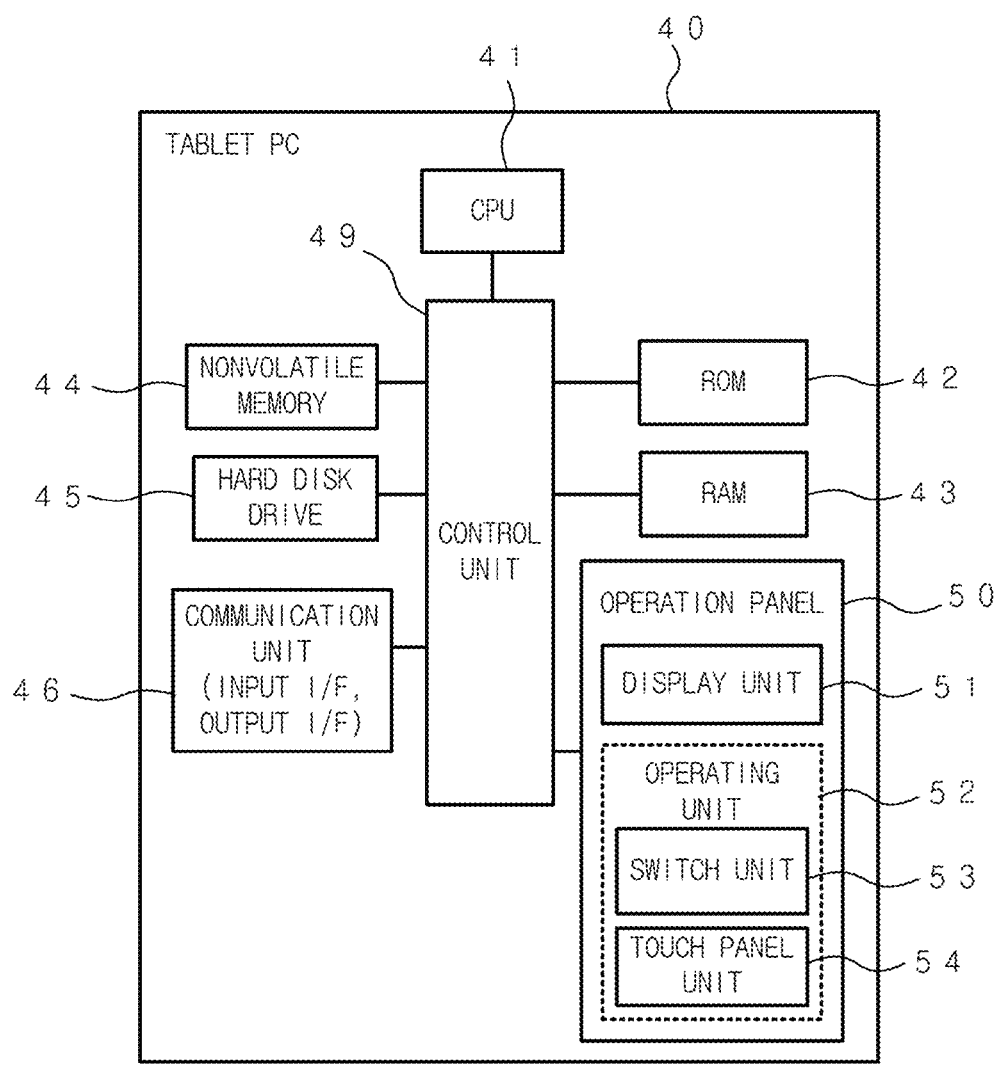
FIG. 2 is a block diagram showing the schematic configuration of the tablet PC according to the embodiment.

FIG. 2 is a block diagram showing the schematic configuration of the tablet PC 40. The tablet PC 40 comprises a control unit 49 for entirely controlling the operation of the tablet PC 40. In the tablet PC 40, the control unit 49 is connected with a CPU (Central Processing Unit) 41, a ROM (Read Only Memory) 42, a RAM (Random Access Memory) 43, a nonvolatile memory 44, a hard disk drive 45, a communication unit 46, an operation panel 50 and the like.

By the control unit 49, a middleware, application programs and the like are executed on an OS (Operating System) program as a base. The CPU 41 executes the arithmetic processing instead of the control unit 49.

In the ROM 42, the programs for starting up the tablet PC 40 are stored. After the tablet PC 40 is started up in accordance with the above programs, the programs stored in the hard disk drive 45 are loaded into the RAM 43. By executing various types of processes by the control unit 49 in accordance with the loaded programs, each function of the tablet PC 40 is realized.

The RAM 43 is used as a work memory for temporarily storing various data when the CPU 41 executes the process in accordance with the programs.

The nonvolatile memory 44 is a memory (flash memory) in which the stored data is not damaged even if the tablet PC 40 is turned off, and is used for storing various types of setting information and the like.

The hard disk drive 45 is a large-capacity nonvolatile memory device. In the hard disk drive 45, an OS program, various types of application programs, various types of job histories and the like, are stored. Further, in the hard disk drive 45, the program for executing a series of the control of the tablet PC 40 by the control unit 49, the program for instructing the tablet PC 40 to execute the process as the handwritten contents aggregation device, and the like are stored. The hard disk drive 45 may be another type of storing medium, such as an SSD (Solid State Drive) or the like.

The communication unit 46 has the function as the input I/F and the output I/F. Specifically, the communication unit 46 has the function for communicating with the image forming apparatus 10 and another external device via the network, such as the LAN 3. Further, the communication unit 46 comprises a connection port for connecting with a storing device, such as an SD card, a USB (Universal Serial Bus) memory or the like. The communication unit 46 writes and reads the data in/from the storing device which is connected via the connection port.

The operation panel 50 comprises a display unit 51 and an operating unit 52. The operating unit 52 comprises a switch unit 53, such as a start button and the like, and a touch panel unit 54. The display unit 51 comprises a liquid crystal display (LCD) and the like, and has a function for displaying various types of operation windows, setting windows and the like. The control unit 49 controls the display contents to be displayed by the operation panel 50 and the reception of the operation via the operation panel 50.

The touch panel unit 54 is provided on the display unit 51. The touch panel unit 54 detects the touch position (coordinate position) on which the physical screen of the display unit 51 is pressed down by using a touch pen, the user's finger or the like, the flick operation, the drag operation and the like. Further, the control unit 49 recognizes the input of the handwritten contents (the stroke of the handwritten contents) which are written by a user, in accordance with the change in the touch position which is continuously detected (operation information).

In this embodiment, by executing the application program stored in the hard disk drive 45 by the control unit 49, the tablet PC 40 prepares the aggregation file and the output file as described above, and the like.

Figure 3:
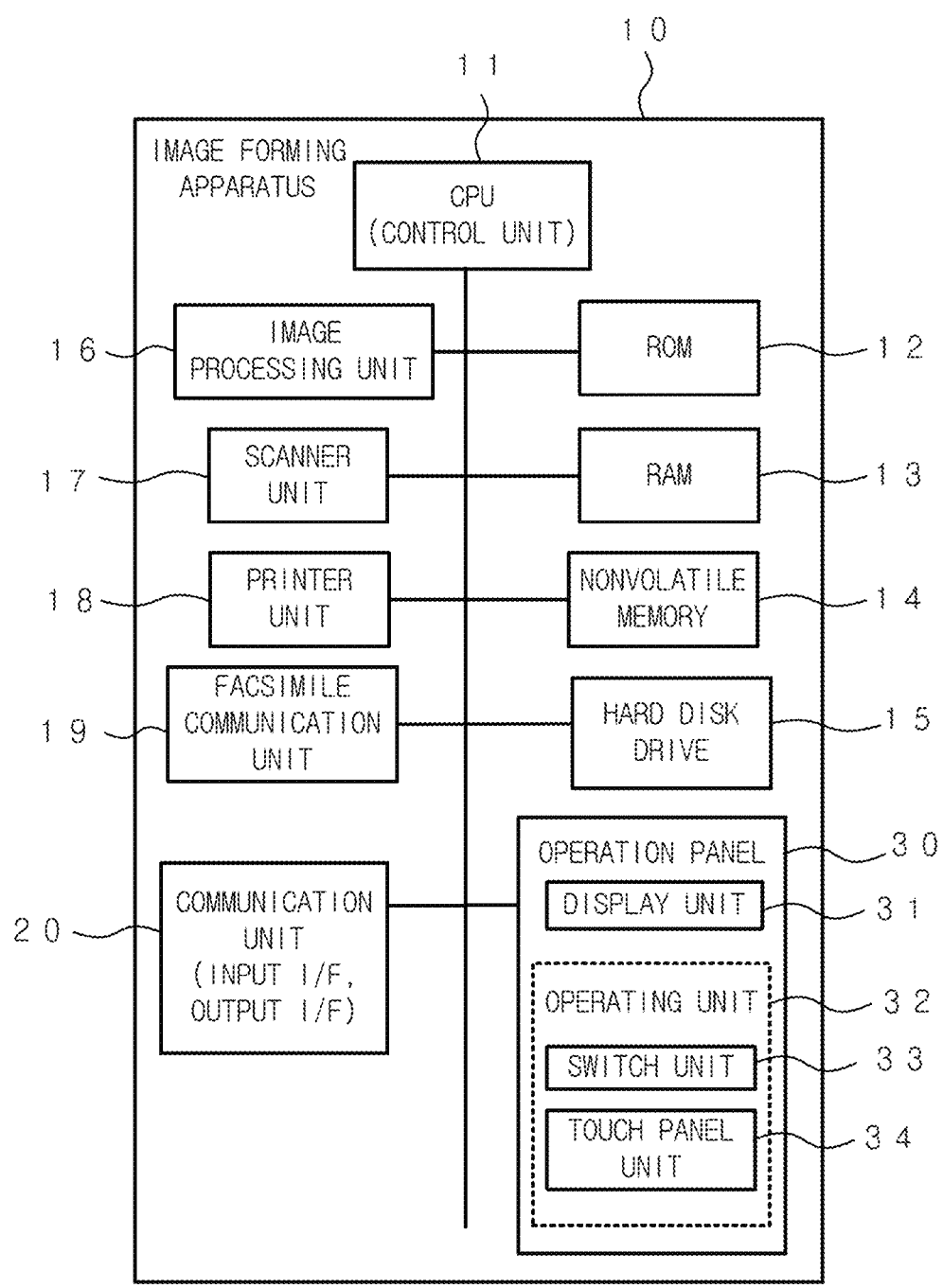
FIG. 3 is a block diagram showing the schematic configuration of the image forming apparatus according to the embodiment.

FIG. 3 is a block diagram showing the schematic configuration of the image forming apparatus 10. The image forming apparatus 10 comprises a CPU 11 for entirely controlling the operation of the image forming apparatus 10. In the image forming apparatus 10, the CPU 11 is connected with a ROM 12, a RAM 13, a nonvolatile memory 14, a hard disk drive 15, an image processing unit 16, a scanner unit 17, a printer unit 18, a facsimile communication unit 19, a communication unit 20 and an operation panel 30 via a bus.

By the control unit 11, a middleware, application programs and the like are executed on an OS program as a base. In the ROM 12, various types of programs are stored. By executing various types of processes by the CPU 11 in accordance with the programs, each function of the image forming apparatus 10 is realized. In the ROM 12, the program for executing a series of the control of the image forming apparatus 10 by the CPU 11 is stored.

The RAM 13 is used as a work memory for temporarily storing various data when the CPU 11 executes the process in accordance with the programs and as an image memory for storing image data.

The nonvolatile memory 14 is a memory (flash memory) in which the stored data is not damaged even if the image forming apparatus 10 is turned off, and is used for storing various types of setting information and the like.

The hard disk drive 15 is a large-capacity nonvolatile memory device. In the hard disk drive 15, an OS program, various types of application programs, user information, the files, such as print data, image data and the like, the job information history and the like, are stored.

The image processing unit 16 carries out the rasterizing process for converting print data into image data, the compression/decompression process for the image data, and the like in addition to the processings, such as the enlargement/reduction or the rotation of image data.

The scanner unit 17 has the function for obtaining image data by optically reading an image of an original. For example, the scanner unit 17 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 18 has the function for forming an image on the recording sheet in accordance with the image data. In this embodiment, the printer unit 18 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. Alternatively, an image may be formed by another type of printer.

The facsimile communication unit 19 has the function for transmitting and receiving the image data to/from an external device having the facsimile function via a public line.

The communication unit 20 has the function as the input I/F and the output I/F. Specifically, the communication unit 20 has the function for transmitting and receiving the data to/from an external device via the network, such as the LAN 3. Further, the communication unit 20 comprises a connection port for connecting with a storing device, such as an SD card, a USB memory or the like. The communication unit 20 writes and reads the data in/from the storing device which is connected via the connection port.

The operation panel 30 comprises a display unit 31 and an operating unit 32. The operating unit 32 comprises a switch unit 33, such as a start button and the like, and a touch panel unit 34. The display unit 31 comprises a liquid crystal display and the like, and has a function for displaying various types of operation windows, setting windows and the like. The control unit 11 controls the display contents to be displayed by the operation panel 30 and the reception of the operation via the operation panel 30.

The touch panel unit 34 is provided on the display unit 31. The touch panel unit 34 detects the touch position (coordinate position) on which the physical screen of the display unit 31 is pressed down by using a touch pen, the user's finger or the like, the flick operation, the drag operation and the like. Further, the control unit 11 recognizes the input of the handwritten contents which are written by a user, in accordance with the change in the touch position which is continuously detected (operation information).

In case that the image forming apparatus 10 receives the above-described output file in which the handwritten contents are aggregated, from the aggregation tablet PC, the image forming apparatus 10 prints an image in accordance with the output file.

Figure 4:
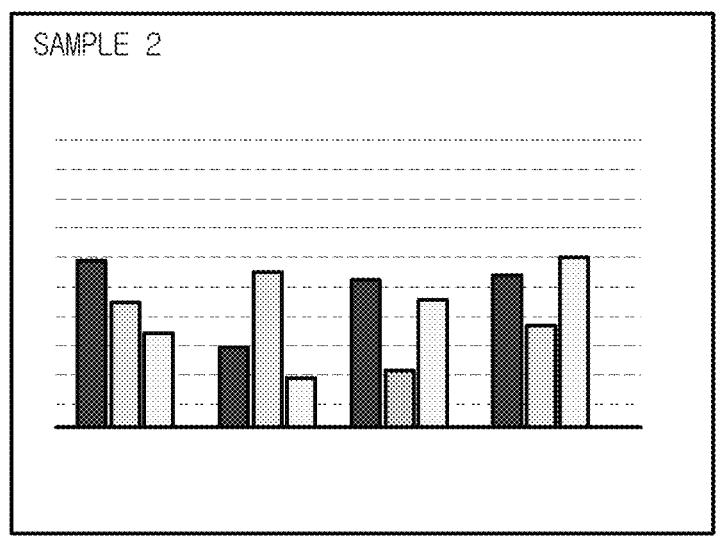
FIG. 4 is a view showing an example of one slide in the original file.
Figure 5:
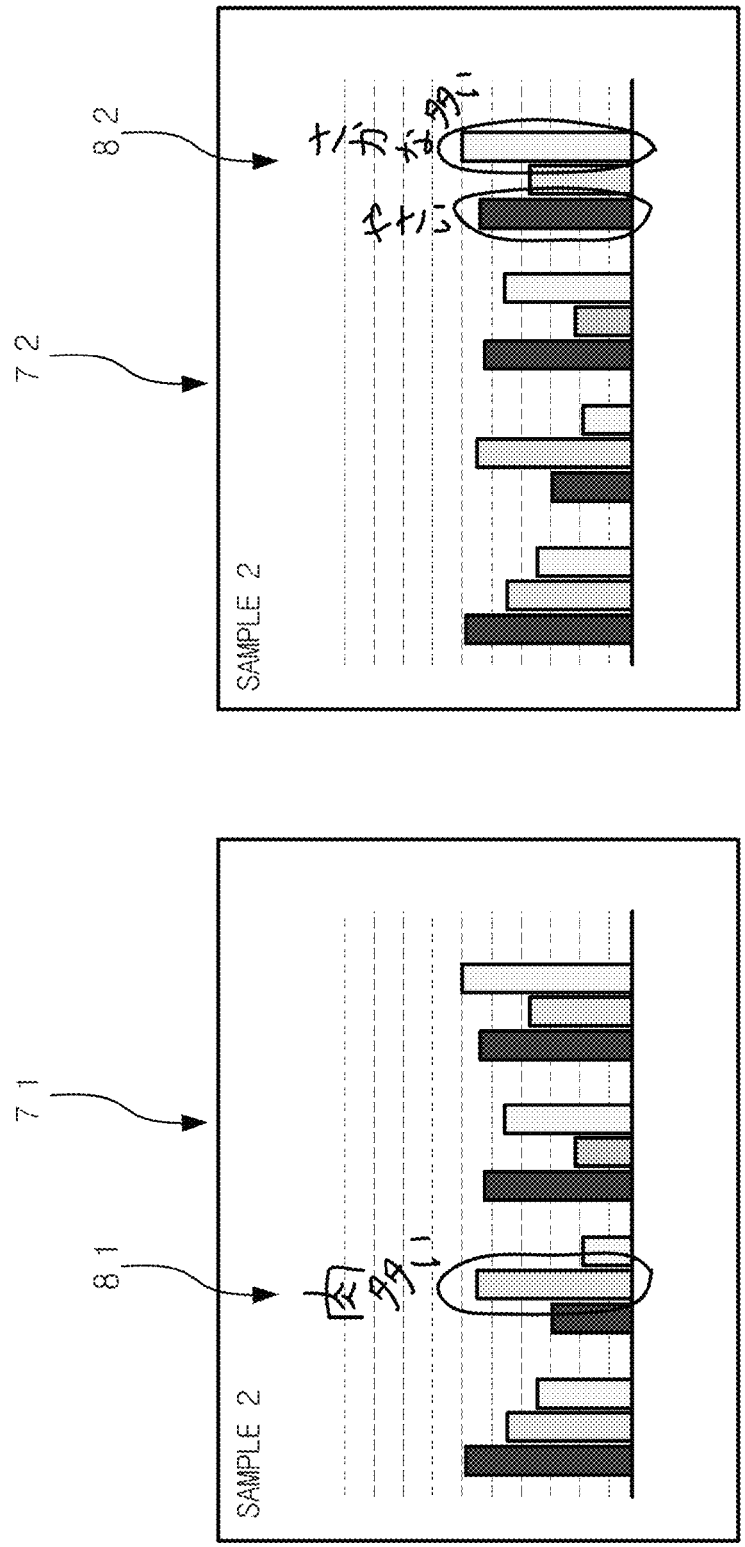
FIG. 5 is a view showing each slide of the first file and the second file, which is the same as the slide of the original file shown in FIG. 4.

Next, the specific example of the case in which the written information extracted from the first file and the second file is aggregated will be explained by referring to FIGS. 4 to 6. FIG. 4 shows one slide (page) 70 of the original file having the Power Point® format. FIG. 5 shows the slide 71 in which the handwritten contents are added to the slide of the first file, which is the same as the slide 70 shown in FIG. 4, and the slide 72 in which the handwritten contents are added to the slide of the second file, which is the same as the slide 70 shown in FIG. 4.

In the slide 71, the draw information 81 indicating the handwritten contents added to the slide 70 is added. In the slide 72, the draw information 82 indicating the handwritten contents added to the slide 70 is added.

Figure 6:
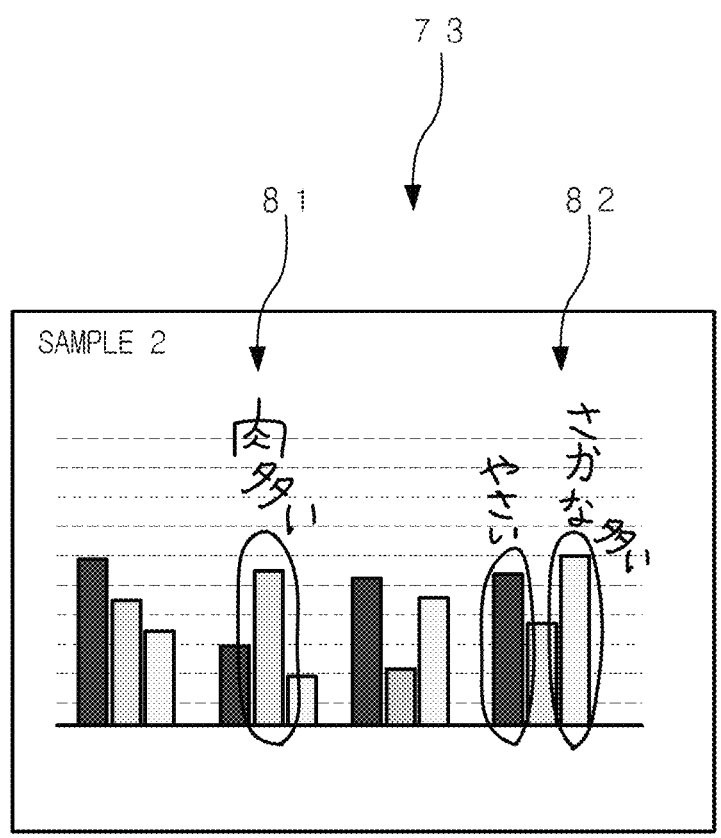
FIG. 6 is a view showing the slide of the third file, which is the same as the slide of the original file shown in FIG. 4.

FIG. 6 shows the slide 73 in which the handwritten contents included in the slides 71 and 72 are aggregated in the slide which is the same as the slide 70 shown in FIG. 4. The slide 73 is prepared as one slide (page) of the above-described aggregation file. In the slide 73, the draw information 81 and the draw information 82 are added to the slide 70 without changing the position of the draw information in the slides 71 and 72. A user can confirm both of the draw information 81 and the draw information 82 at the same time only by confirming the slide 73 without confirming the slide 71 and the slide 72 separately.

Figure 7:
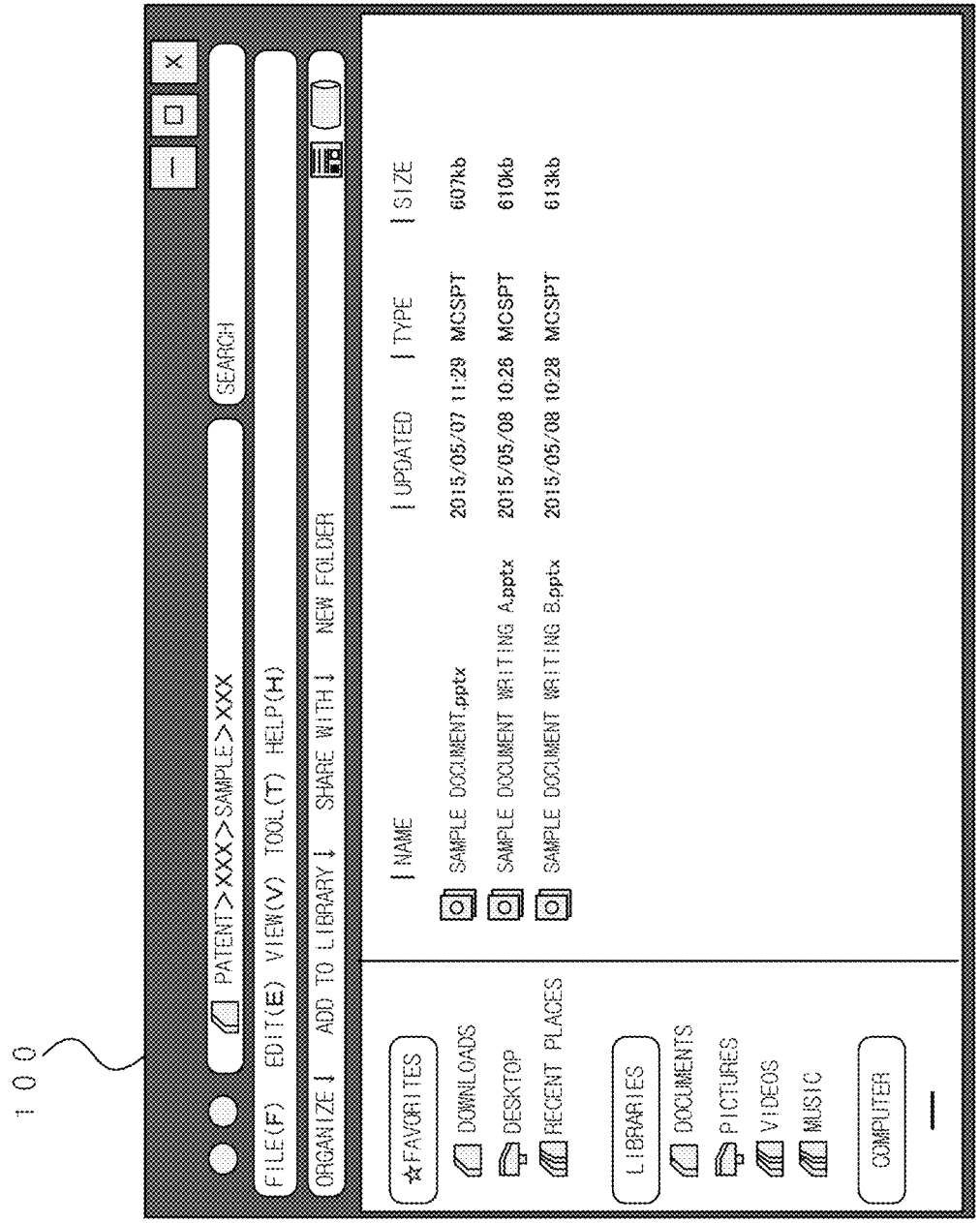
FIG. 7 is a view showing the window indicating the folders in which the original file, the first file and the second file are stored.

Next, the preparation of the aggregation file will be explained in detail. FIG. 7 shows the window 100 for displaying the list of the files stored in the predetermined folder in the aggregation tablet PC. In this folder, the file "sample document.pptx" which is the original file, the file "sample document writing A.pptx" which is the first file and the file "sample document writing B.pptx" which is the second file are stored.

The aggregation tablet PC compares the file name of the original file stored in this folder (the predetermined place) with those of the other files stored in this folder, and recognizes the other files having the file name including the file name of the original file, as the files (in this case, the first file and the second file) from which the handwritten contents to be aggregated are extracted. In this embodiment, the predetermined place is the folder in which the original file is stored. The original file may be stored in the place which is different from the place of the file from which the handwritten contents to be aggregated are extracted.

Figure 8:
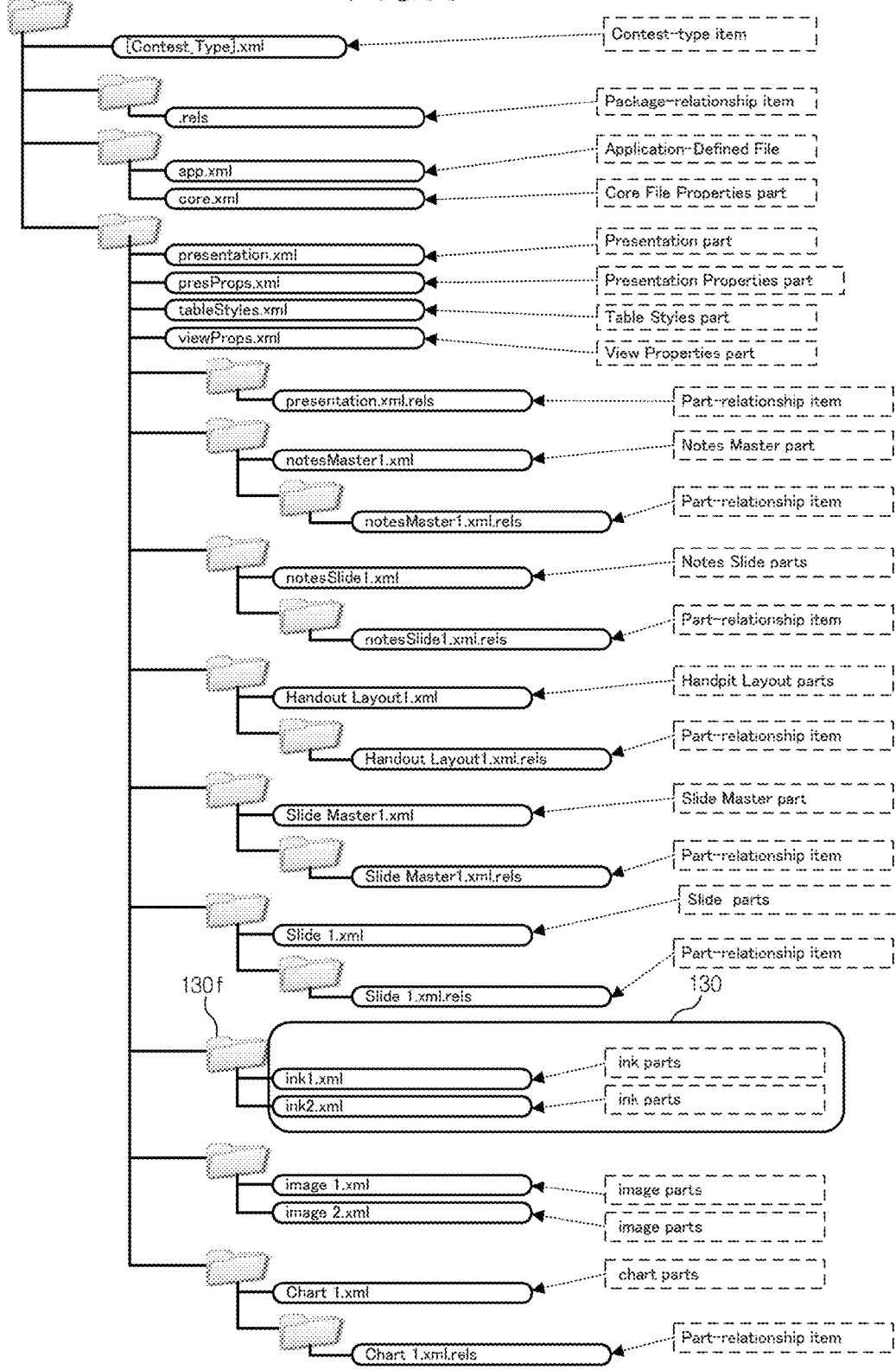
FIG. 8 is a view showing the file structure of the original file.

FIG. 8 shows an example of the file structure of the original file. In this embodiment, a plurality of types of data (files) are stored in the folders for each type of data. The folders in which the data are stored constitute one file by being hierarchized in a tree structure. In the file structure shown in FIG. 8, the ink files 130, such as "ink1.xml", "ink2.xml" and the like, are the data (written information) indicating the handwritten contents. The ink files 130 (written information) are stored in the special folder (ink folder) 130f. The aggregation tablet PC extracts the ink files from the first file and the second file as the written information indicating the handwritten contents.

In case that the aggregation file is prepared, when the ink files 130 which are written information indicating the handwritten contents are not included in the original file, the ink file extracted from the first file and the ink file extracted from the second file are stored in the ink folder 130f (when the ink folder 130f does not exist in the original file, the ink folder 130f is prepared).

In case that the ink files are included in the original file, the difference between the included ink file 130 and the ink file extracted from the first file is extracted, and is stored in the ink folder 130f as the ink file indicating the handwritten contents added to the first file. Similarly, the difference between the included ink file 130 and the ink file extracted from the second file is extracted, and is stored in the ink folder 130f.

Figure 9:
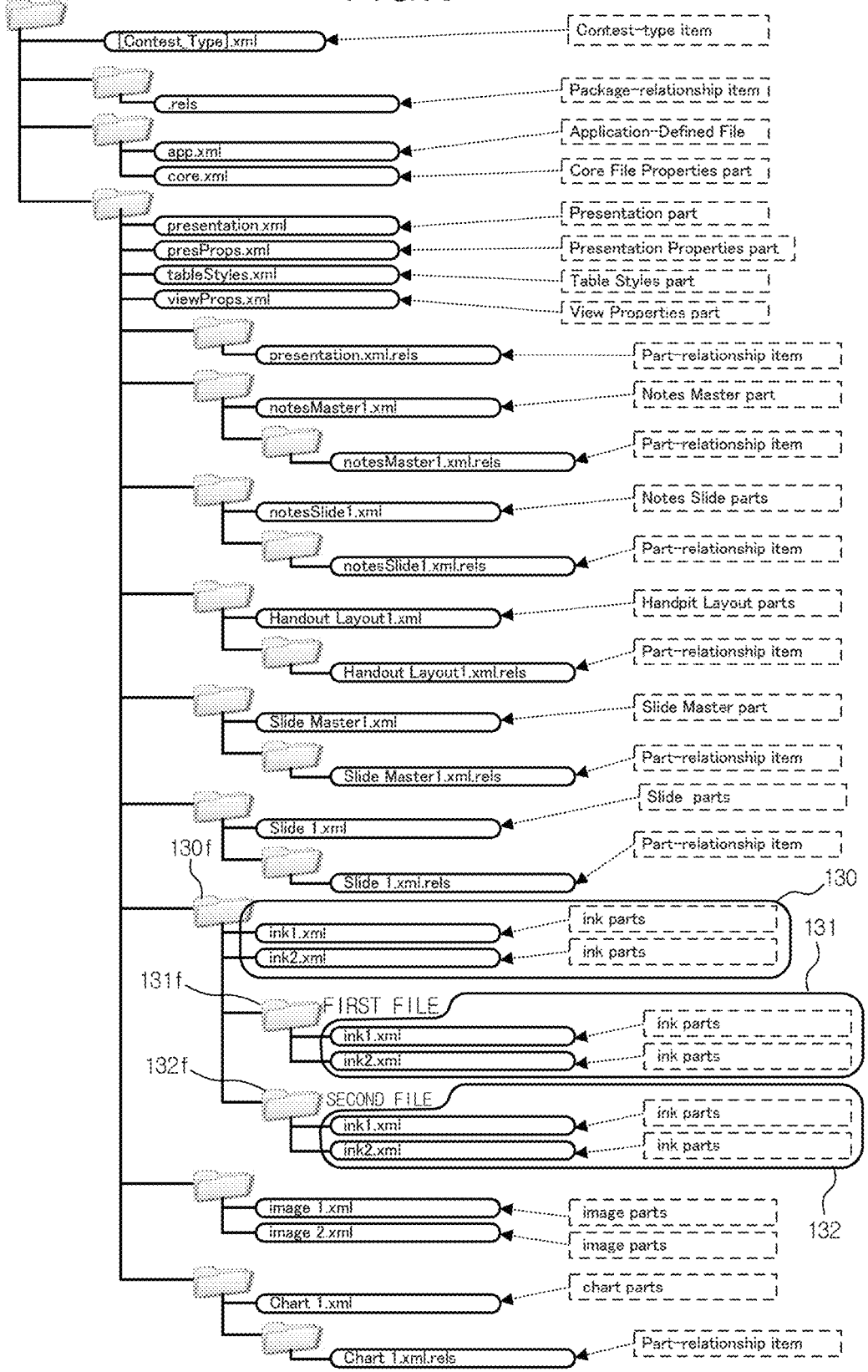
FIG. 9 is a view showing an example of the file structure of the aggregation file.

FIG. 9 shows the file structure of the aggregation file prepared in accordance with the original file of FIG. 8, in which the ink files are previously included. In FIG. 9, the difference between the ink file 130 and the ink file extracted from the first file is the ink file 131, and the difference between the ink file 130 and the ink file extracted from the second file is the ink file 132. The ink file 131 and the ink file 132 are added to the lower layer of the ink file 130.

In case that the aggregation tablet PC adds the extracted ink file to the original file, the aggregation tablet PC prepares the folder (the first sub-folder 131f) for storing the ink file 131 extracted from the first file, in the ink folder 130 (in the lower layer of the ink folder 130). Then, the aggregation tablet PC sets the identification information of the first file (for example, the part which is obtained by removing the common part with the file name of the original file from the file name of the first file) to the name of the first sub-folder 131f. Further, the aggregation tablet PC prepares the folder (the second sub-folder 132f) for storing the ink file 132 extracted from the second file, and sets the identification information of the second file (for example, the part which is obtained by removing the common part with the file name of the original file from the file name of the second file) to the name of the second sub-folder 132f. Then, the aggregation tablet PC stores the ink file 131 extracted from the first file (or obtained by extracting the difference between the ink file 130 and the ink file extracted from the first file) in the first sub-folder 131f, and stores the ink file 132 extracted from the second file (or obtained by extracting the difference between the ink file 130 and the ink file extracted from the second file) in the second sub-folder 132f. As described above, each ink file added to the aggregation file is managed so as to be related to the file which is the source of the ink file to be extracted (the first file or the second file).

Figure 10:
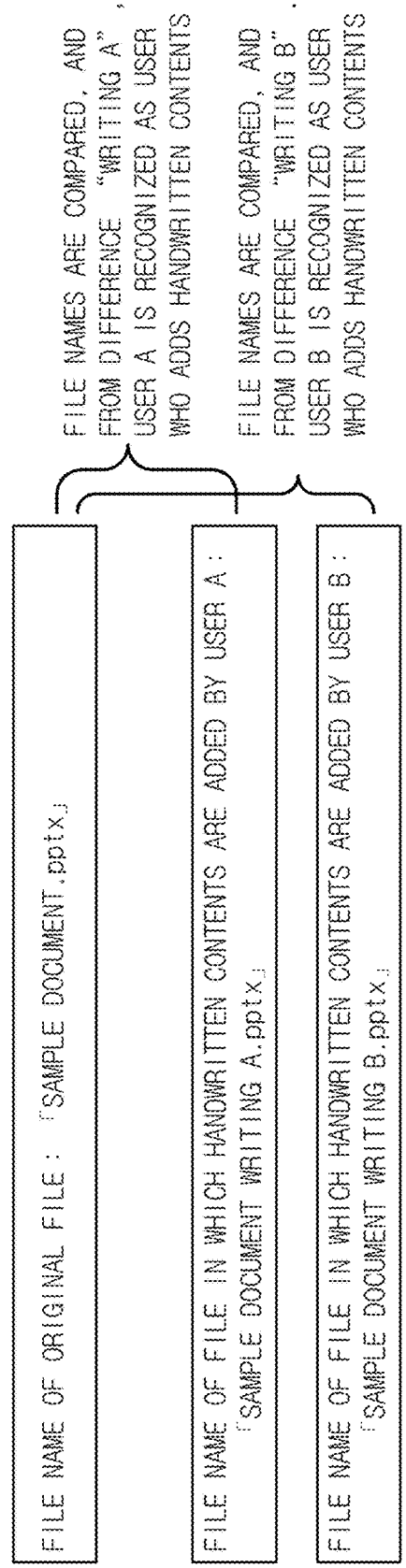
FIG. 10 is a view showing the situation in which the difference between the file name of the original file and the file name of the first file and the difference between the file name of the original file and the file name of the second file are recognized as the user identification information.

FIG. 10 shows a specific example in which the identification information of the first file and the identification information of the second file are obtained. In FIG. 10, the difference (writing A) between the file name of the original file (sample document.pptx) and the file name of the first file (sample document writing A.pptx) is recognized as the identification information of the first file (identification information (user name) of the user who adds the handwritten contents to the first file). Then, the identification information of the first file is set as the name of the folder for storing the written information (ink file) extracted from the first file. Further, the difference (writing B) between the file name of the original file and the file name of the second file (sample document writing B.pptx) is recognized as the identification information of the second file (identification information (user name) of the user who adds the handwritten contents to the second file). Then, the identification information of the second file is set as the name of the folder for storing the written information (ink file) extracted from the second file.

Figure 11:
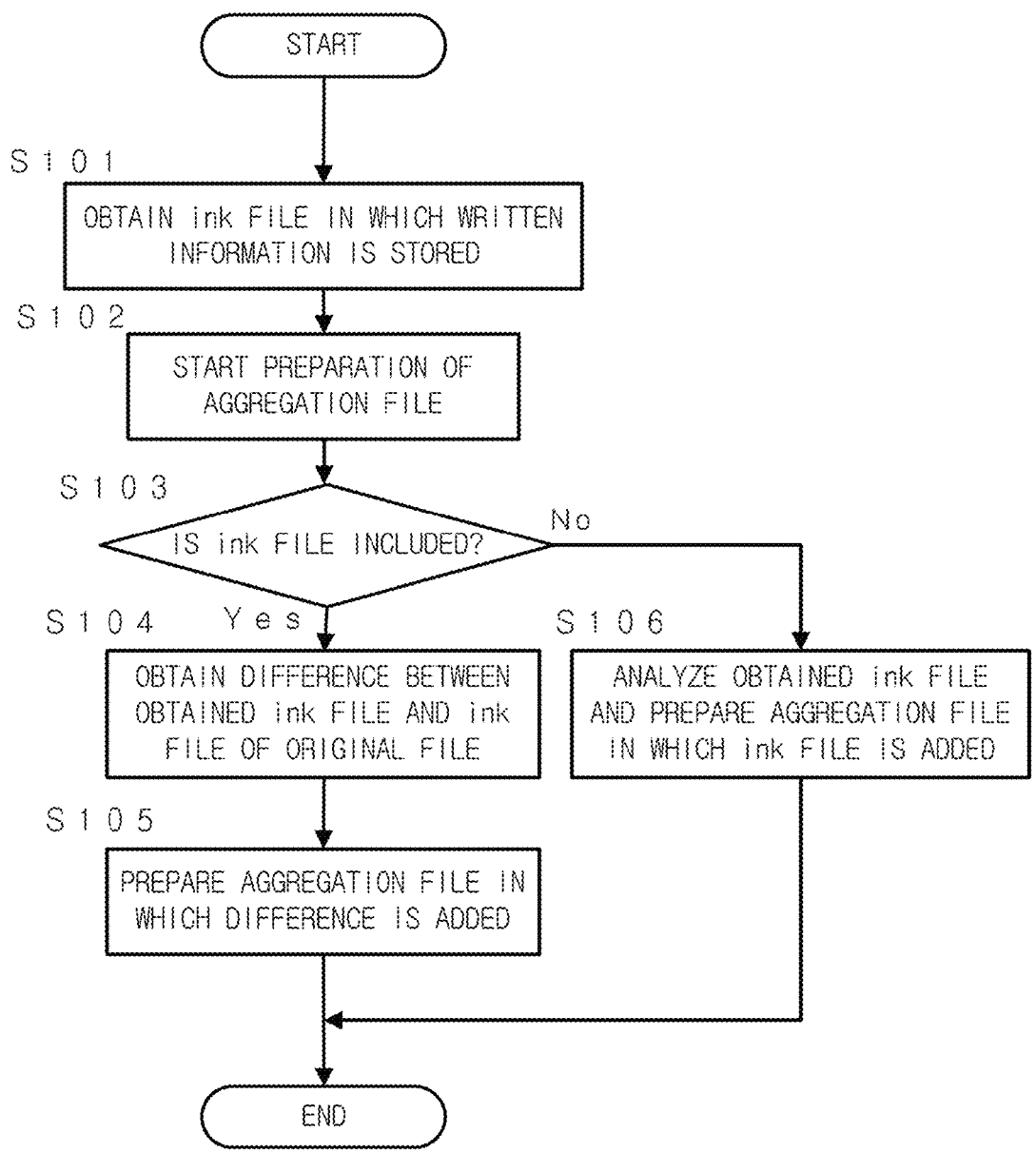
FIG. 11 is a flowchart showing the process which is carried out in case that the third file is prepared.

FIG. 11 is the flowchart for explaining the process which is carried out in case that the aggregation file is prepared. Firstly, the ink files which are the written information are obtained from the first file and the second file (Step S101).

Next, the preparation of the aggregation file is started in accordance with each ink file obtained in Step S101 and the original file (Step S102). Then, it is judged whether the ink file is included in the original file (Step S103). In case that the ink file is not included (Step S103; No), the ink file obtained in Step S101 is analyzed and the aggregation file in which the obtained ink file is added to the original file is prepared (Step S106). The process is ended.

Specifically, the folder for storing the ink file extracted from the first file is prepared in the ink folder of the original file. Then, the ink file extracted from the first file is stored in the prepared folder, and the user name of the first file is set as the folder name of the prepared folder. Further, the folder for storing the ink file extracted from the second file is prepared in the ink folder of the original file. Then, the ink file extracted from the second file is stored in the prepared folder, and the user name of the second file is set as the folder name of the prepared folder.

In case that the ink file is already included in the original file (Step S103; Yes), the ink file which is already included in the original file is compared with each ink file obtained in Step S101. The difference between the ink file which is already included in the original file and each ink file obtained in Step S101 is obtained (Step S104). The aggregation file in which the obtained difference is added to the original file is prepared (Step S105). Then, the process is ended.

That is, in case that the handwritten contents are originally included in the original file, because the handwritten contents included in the file from which the handwritten contents to be aggregated are extracted include the handwritten contents which are originally included in the original file, the obtained difference indicates the handwritten contents which are newly added to the file from which the handwritten contents to be aggregated are extracted. Therefore, the difference between the ink file of the original file and the ink file extracted from the file from which the handwritten contents to be aggregated are extracted is set to the ink file indicating the contents which are added in handwriting by a user of the file from which the handwritten contents to be aggregated are extracted (the ink file for indicating the difference), and the ink file for indicating the difference is added to the original file.

In this embodiment, the folder for storing the ink file for indicating the difference between ink file extracted from the first file and the ink file of the original file is prepared in the ink folder of the original file. Then, the ink file for indicating the above difference is stored in the prepared folder, and the user name of the first file is set as the folder name of the prepared folder. Further, the folder for storing the ink file for indicating the difference between the ink file extracted from the second file and the ink file of the original file is prepared in the ink folder of the original file. Then, the ink file for indicating the above difference is stored in the prepared folder, and the user name of the second file is set as the folder name of the prepared folder.

Next, the output file prepared in accordance with the aggregation file and having a format for display data or print data will be explained by using the specific example of the original file and the aggregation file. The output file may be display data or print data. In this embodiment, the case in which the output file is print data will be explained.

Figure 12:
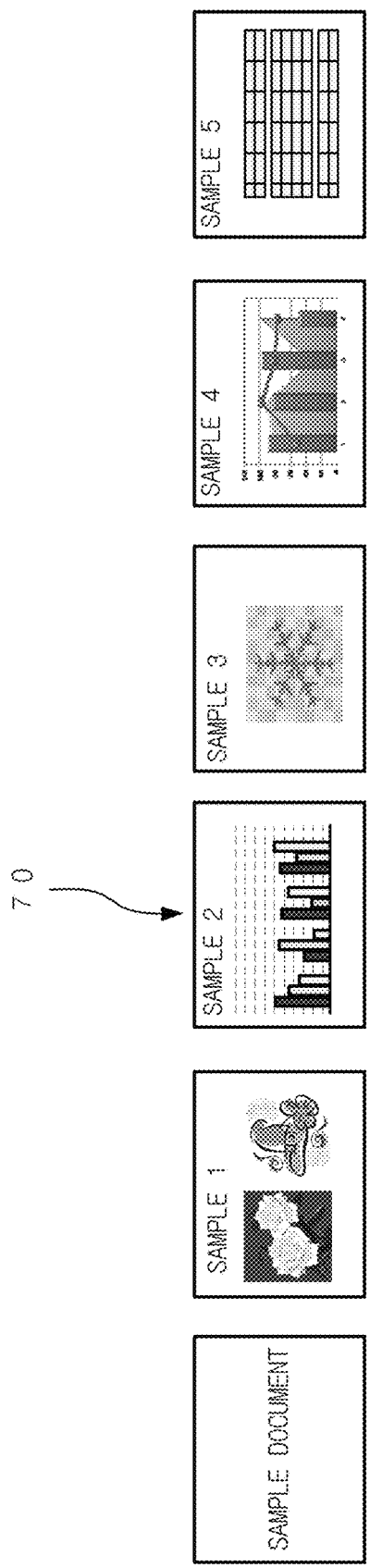
FIG. 12 is a view showing an example of the slides of the original file.

FIG. 12 shows an example of the slides which constitutes the original file. In the example of FIG. 12, six slides are included in the original file. The slide numbers are attached to six slides in order from the left. The third slide is the slide 70 shown in FIG. 4.

Figure 13:
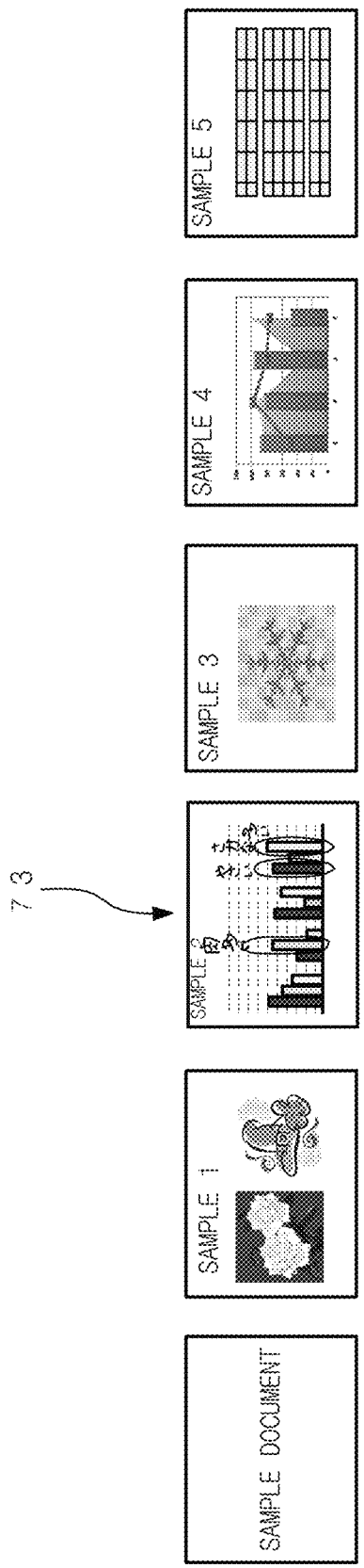
FIG. 13 is a view showing an example of the slides of the aggregation file prepared in accordance with the original file shown in FIG. 12.

FIG. 13 shows the slides of the aggregation file prepared from the original file shown in FIG. 12. In FIG. 13, the third slide is changed to the slide 73 shown in FIG. 6, in which the written information extracted from the first file and the second file is added to the slide 70 shown in FIG. 4.

Next, the output file prepared in accordance with the aggregation file shown in FIG. 13 will be explained by using a plurality of examples. The aggregation tablet PC receives the print setting from a user, and prepares the output file having a format for print data from the aggregation file in accordance with the print setting. In the examples explained below, the print data (output file) prepared in case that the aggregation file shown in FIG. 13 is printed in 4in1 layout (in which four slides are arranged in one page) is used.

EXAMPLE 1

Normal Output

Figure 14:
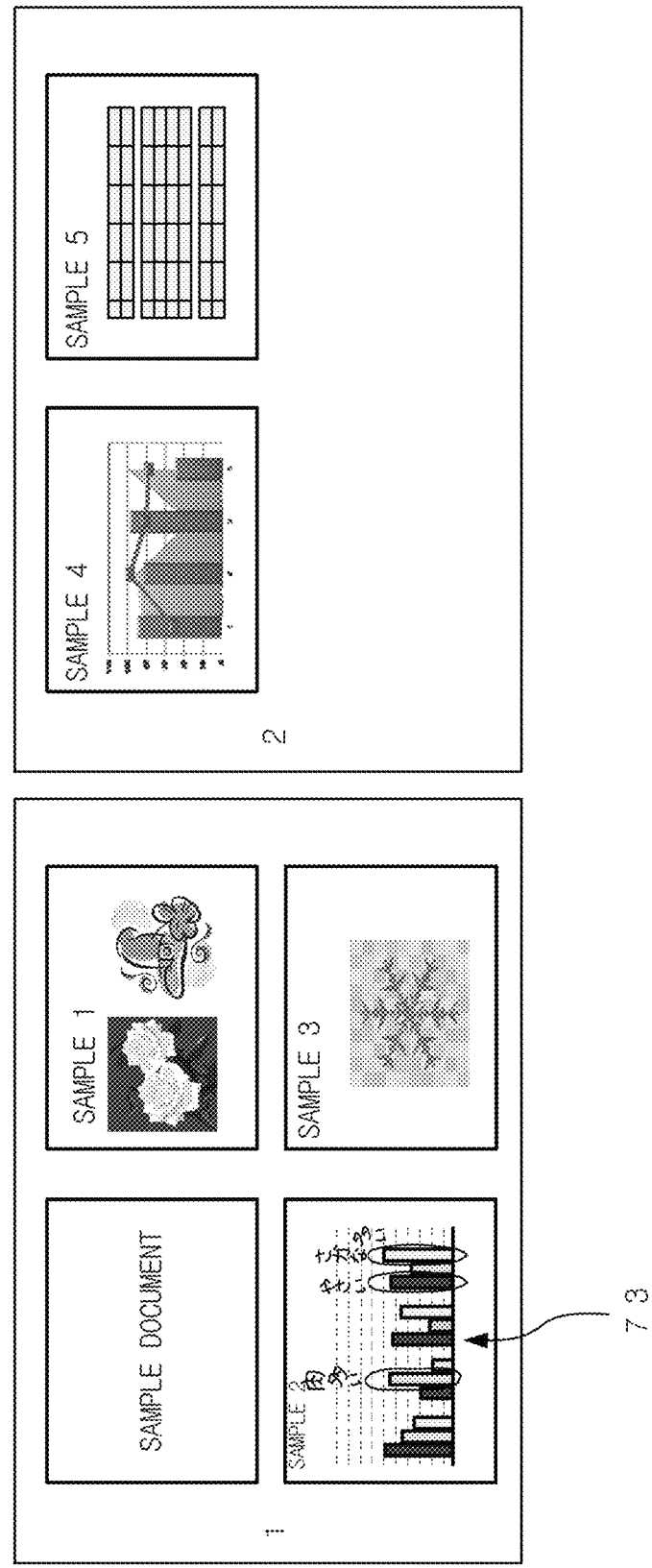
FIG. 14 is a view showing the print preview of the output file in Example 1.

In Example 1, the print data (output file) is prepared without changing the contents of each slide of the aggregation file. FIG. 14 shows the print preview of the output file prepared in Example 1. In the output file shown in FIG. 14, the first to the fourth slides of six slides shown in FIG. 13 are arranged in the first page and the fifth and the sixth slides are arranged in the second page.

EXAMPLE 2

Figure 15:
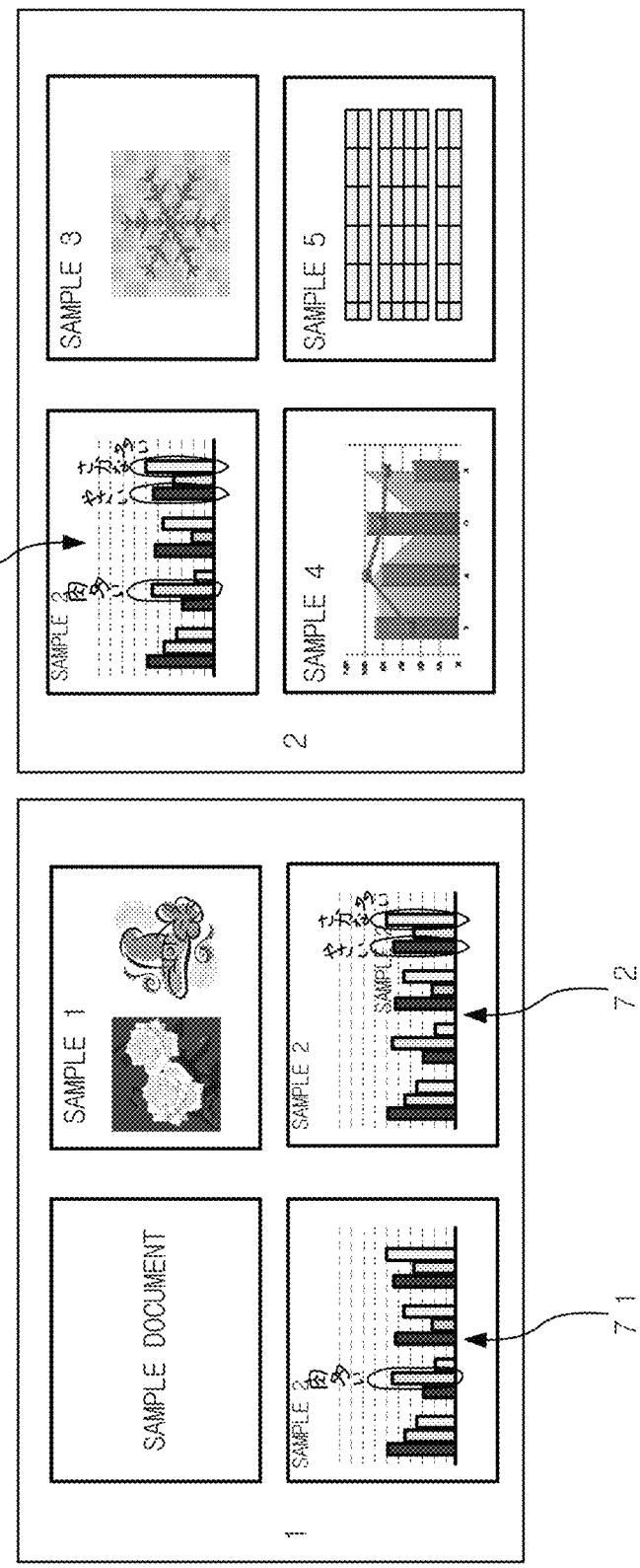
FIG. 15 is a view showing the print preview of the output file in Example 2.

Output File in Which the Slides Which are the Sources of the Written Information to be Extracted are Added to the Aggregation File In Example 2, the print data (output file) is prepared by adding the slide of the first file in which the written information aggregated in the aggregation file is included and the slide of the second file in which the written information aggregated in the aggregation file is included (the slides which are the sources of the written information to be extracted), as the separate slides, to the aggregation file. FIG. 15 shows the print preview of the output file prepared in Example 2.

The output file shown in FIG. 15 has eight slides obtained by adding the slide 71 and the slide 72 (See FIG. 5) which are the sources of the written information (draw information 81 and draw information 82 (See FIG. 5)) aggregated and added in the slide 70, to six slides of the original file when the aggregation file is prepared.

The slide 71 and the slide 72 which are the sources of the written information to be extracted are added before the third slide (slide 73) in the aggregation file. In the output file shown in FIG. 15, eight slides are arranged so as to include four slides in each page from the front slide in order. That is, the first and the second slides of six slides shown in FIG. 13, the slide 71 and the slide 72 are arranged in the first page. The third to the sixth slides of six slides shown in FIG. 13 are arranged in the second page.

As described above, in the output file shown in Example 2, it is possible to confirm not only the slide 73 in which the written information added in handwriting is aggregated, but also each slide which is the source of the written information aggregated in the slide 73, in one printed document.

EXAMPLE 3

Output File in Which the Arrangement of the Slides is Changed

In Example 3, like Example 2, the print data (output file) is prepared by adding the slides which are the sources of the written information to be extracted (the slide 71 of the first file and the slide 72 of the second file) in the aggregation file. At this time, the slides including the written information (the slide 73 in which the written information is aggregated, and the slides 71 and 72 which are the sources of the written information to be extracted) are arranged so as to aggregate the above slides in one page (FIG. 16).

Figure 16:
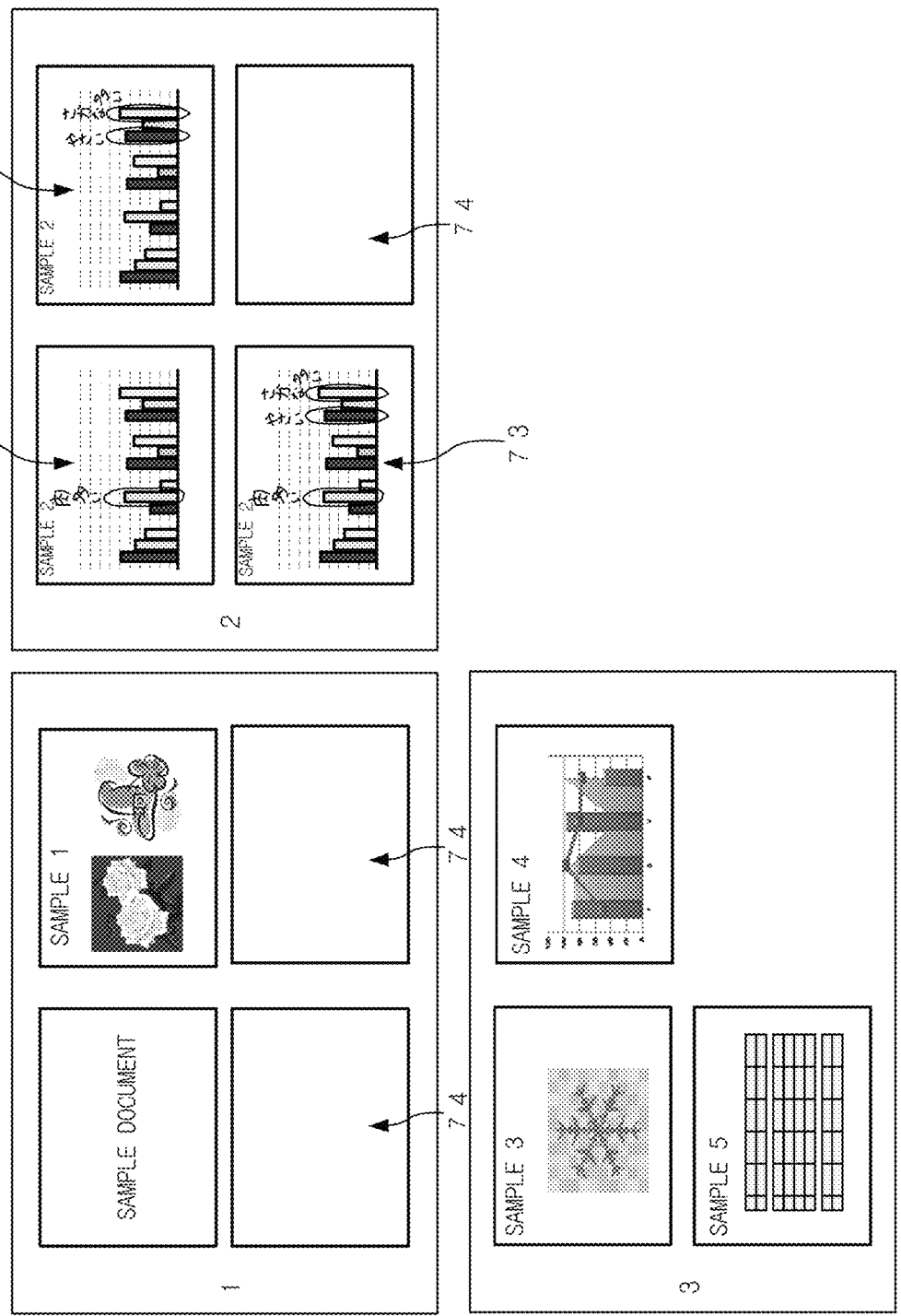
FIG. 16 is a view showing the print preview of the output file in Example 3.

FIG. 16 shows the print preview of the output file prepared in Example 3. In this example, the first and the second slides of six slides of the aggregation file shown in FIG. 13 are arranged in the first page. The slides 71 and 72 which are the sources of the written information to be extracted and the slide 73 in which the written information is aggregated are arranged in the second page. The fourth to the sixth slides in the aggregation file are arranged in the third page.

In FIG. 16, the blank slide 74 is inserted in each space of the first page and the second page. A user recognizes the next page following the page including the blank slide 74 by viewing the blank slide 74. The blank slide 74 is not necessarily required.

FIG. 17 shows an example of the print setting window 110 for selecting one file to be printed among the output files prepared in Examples 1 to 3 in case that the file is printed in accordance with the aggregation file.

In this embodiment, the process for preparing the aggregation file, preparing the output file in accordance with the aggregation file and outputting the output file to the image forming apparatus 10 is executed by using the program installed in the tablet PC 40. For example, the printer driver can function as the above program. By executing the program, the display unit 51 of the tablet PC displays the print setting window and various settings relating to the printing are received. The print setting window 110 is the print setting window which is displayed in case that the Nin1 printing is carried out.

In the print setting window 110, two options "Aggregation in one page" and "No aggregation in one page" are displayed. In case that the option "Aggregation in one page" is selected", the output file is prepared in accordance with Example 1 and is printed. In case that the option "No aggregation in one page" is selected, the tablet PC receives the selection of one option between two options "Slides including written information are printed in the same page" and "Slides including written information are not printed in the same page". In case that the option "Slides including written information are printed in the same page" is selected, the output file is prepared in accordance with Example 3 and is printed. In case that the option "Slides including written information are not printed in the same page" is selected, the output file is prepared in accordance with Example 2 and is printed.

Figure 18:
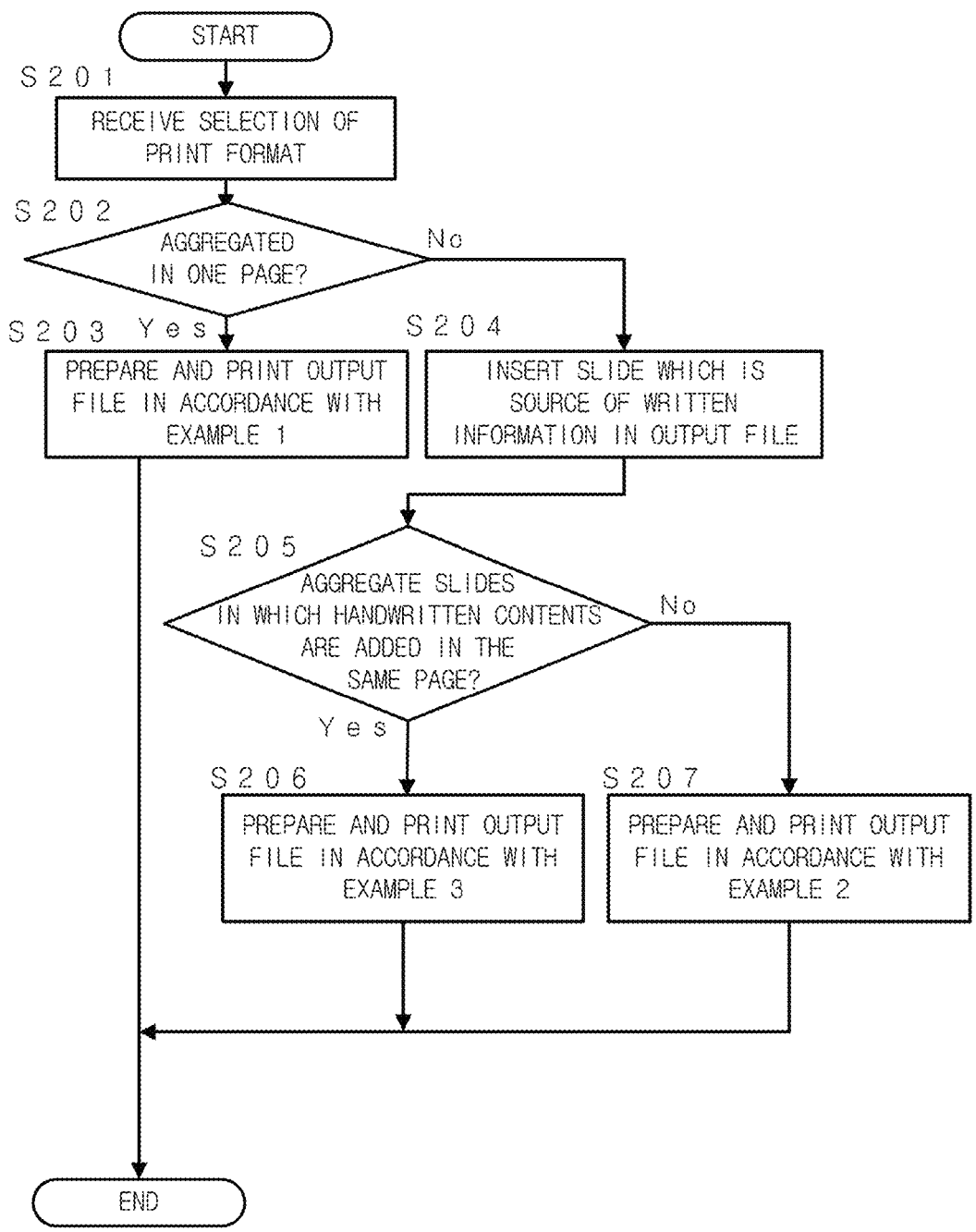
FIG. 18 is a view showing the flowchart indicating the process for preparing the output file in accordance with the selection received via the window shown in FIG. 17.

FIG. 18 is a flowchart indicating the process which is executed by the aggregation tablet PC in case that the selection of one output file to be printed among the output files prepared in Examples 1 to 3 is received. Firstly, in the print setting window 110, the selection of the print format is received (Step S201).

In case that the option "Aggregation in one page" is selected between two options "Aggregation in one page" and "No aggregation in one page" (Step S202; Yes), the output file is prepared in accordance with Example 1 and is printed (Step S203). Then, the process is ended.

In case that the option "No aggregation in one page" is selected (Step S202; No), each slide which is the source of the written information aggregated in the aggregation file is added and inserted as it is in the output file (Step S204).

In case that the option "Slides including written information are printed in the same page" is selected between two options "Slides including written information are printed in the same page" and "Slides including written information are not printed in the same page" (Step S205; Yes), the output file is prepared in accordance with Example 3 and is printed (Step S206). Then, the process is ended. In case that the option "Slides including written information are not printed in the same page" is selected (Step S205; No), the output file is prepared in accordance with Example 2 and is printed (Step S207). Then, the process is ended.

Next, the modified examples of the output file will be explained.

MODIFIED EXAMPLE 1

Method 1 for Avoiding the Written Information from Being Overlapped

Figure 19:
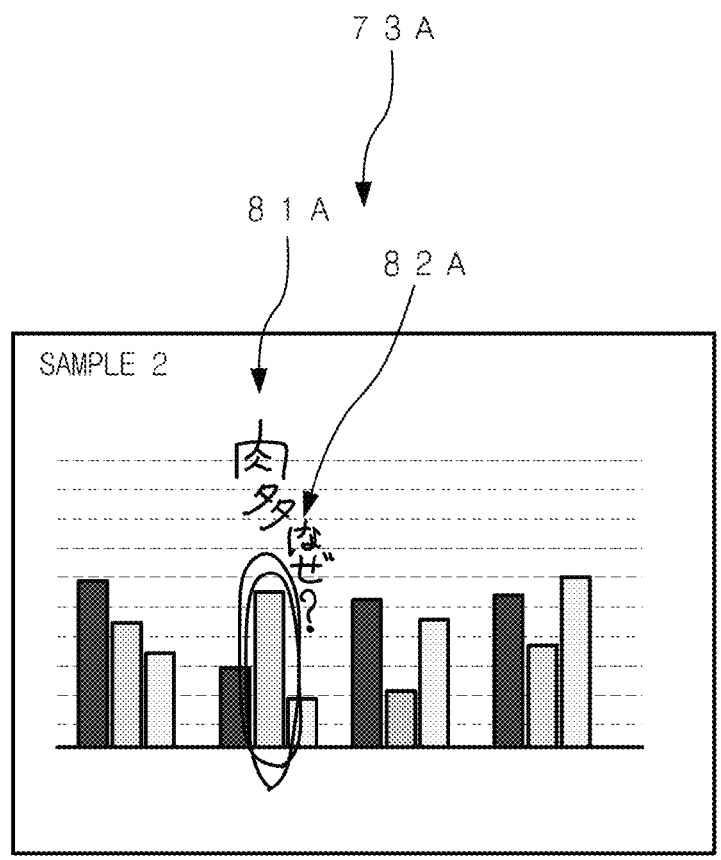
FIG. 19 is a view showing an example of the situation in which the handwritten contents indicated in the written information aggregated in the aggregation file are overlapped.

FIG. 19 shows an example of the situation in which the written information (draw information 81A) extracted from the first file and the written information (draw information 82A) extracted from the second file are aggregated in the slide 73A of the aggregation file. In the slide 73A, the draw information 81A is overlapped with the draw information 82A. As a result, a user cannot easily view the handwritten contents indicated in the draw information.

In Modified Example 1, it is assumed that the handwritten contents extracted from the slide in the first file, which corresponds to the specified slide in the original file and the handwritten contents extracted from the slide in the second file, which corresponds to the above specified slide in the original file, are aggregated in one slide without changing the position of the handwritten contents in each slide. Then, in case that the overlapping area in which the handwritten contents extracted from the slide in the first file are overlapped with the handwritten contents extracted from the slide in the second file is not less than the predetermined area, the output file is prepared by changing (shifting) the position of the handwritten contents in the slide so as to reduce the overlapping area. Therefore, it is possible to secure the visibility of the handwritten contents.

Figure 20:
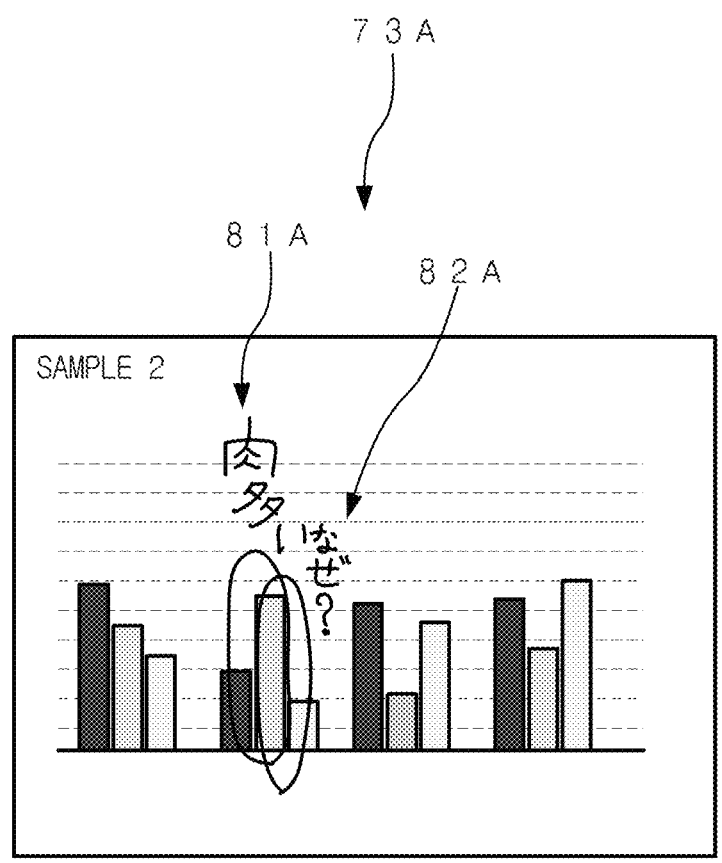
FIG. 20 is a view showing the output file in which the position at which the handwritten contents are reflected is changed so as to reduce the overlapping area in which the handwritten contents indicated in the written information are overlapped.

FIG. 20 shows the slide 73A which is the same as that of FIG. 19, in the output file prepared in accordance with Modified Example 1. As compared with the slide 73A shown in FIG. 19, the overlapping area in which the draw information 81A is overlapped with the draw information 82A is reduced. Therefore, a user can recognize the handwritten contents more easily.

MODIFIED EXAMPLE 2

Method 2 for Avoiding the Written Information from Being Overlapped

In Modified Example 1, the visibility of the handwritten contents indicated in the written information is secured by shifting the position of the handwritten contents. In Modified Example 2, similarly, it is assumed that the handwritten contents extracted from the slide in the first file, which corresponds to the specified slide in the original file and the handwritten contents extracted from the slide in the second file, which corresponds to the above specified slide in the original file, are aggregated in one slide without changing the position of the handwritten contents in each slide. Then, in case that the overlapping area in which the handwritten contents extracted from the slide in the first file are overlapped with the handwritten contents extracted from the slide in the second file is not less than the predetermined area, the output file in which each slide which is the source of the written information to be extracted is included as it is, is prepared like Example 2 described above.

Figure 21:
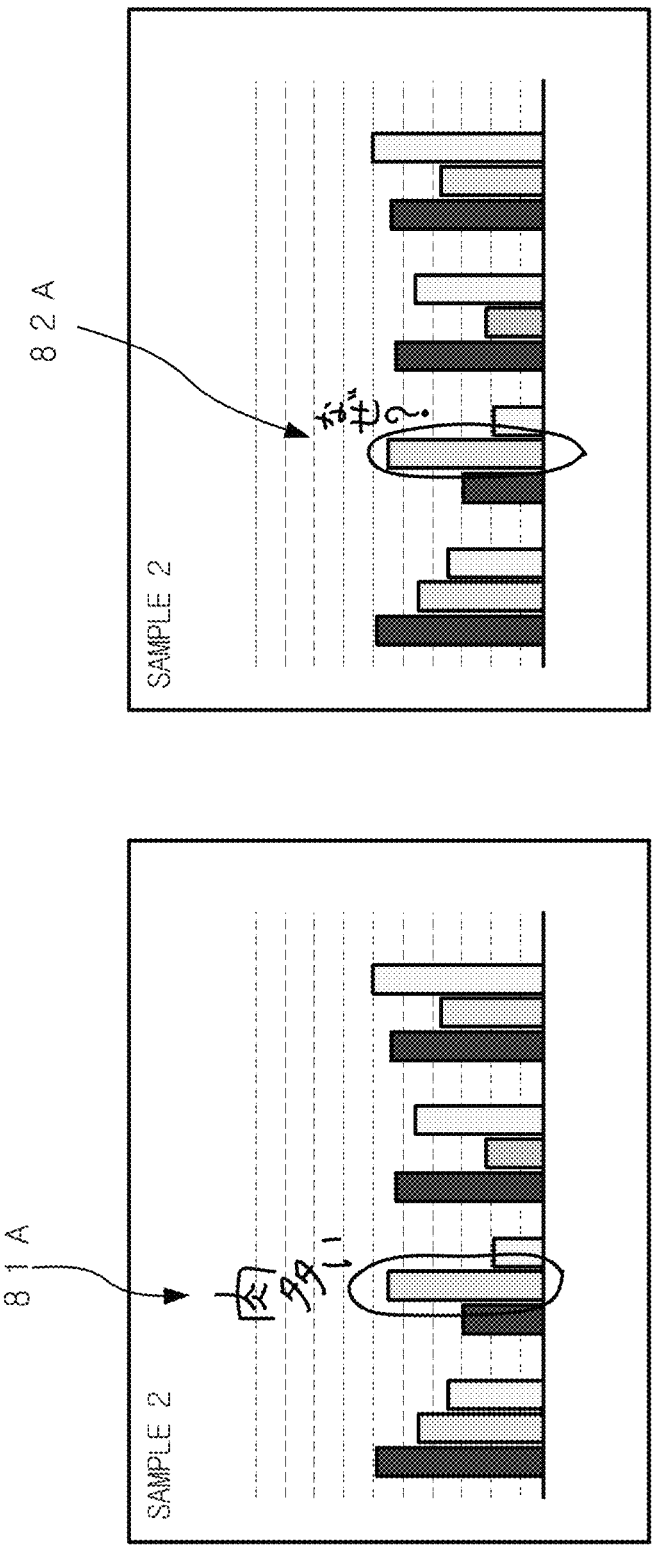
FIG. 21 is a view showing the output file in which each slide which is the source of the written information to be extracted is inserted in case that the handwritten contents indicated in the written information aggregated in the aggregation file are overlapped.

FIG. 21 shows the slide which is the source of the draw information 81A to be extracted in the first file, and the slide which is the source of the draw information 82A to be extracted in the second file. In Modified Example 2, the output file is prepared so as to include two slides shown in FIG. 21. The slide 73A shown in FIG. 19 may be included in the output file. Alternatively, the slide 73A is not necessarily included in the output file.

Figure 22:
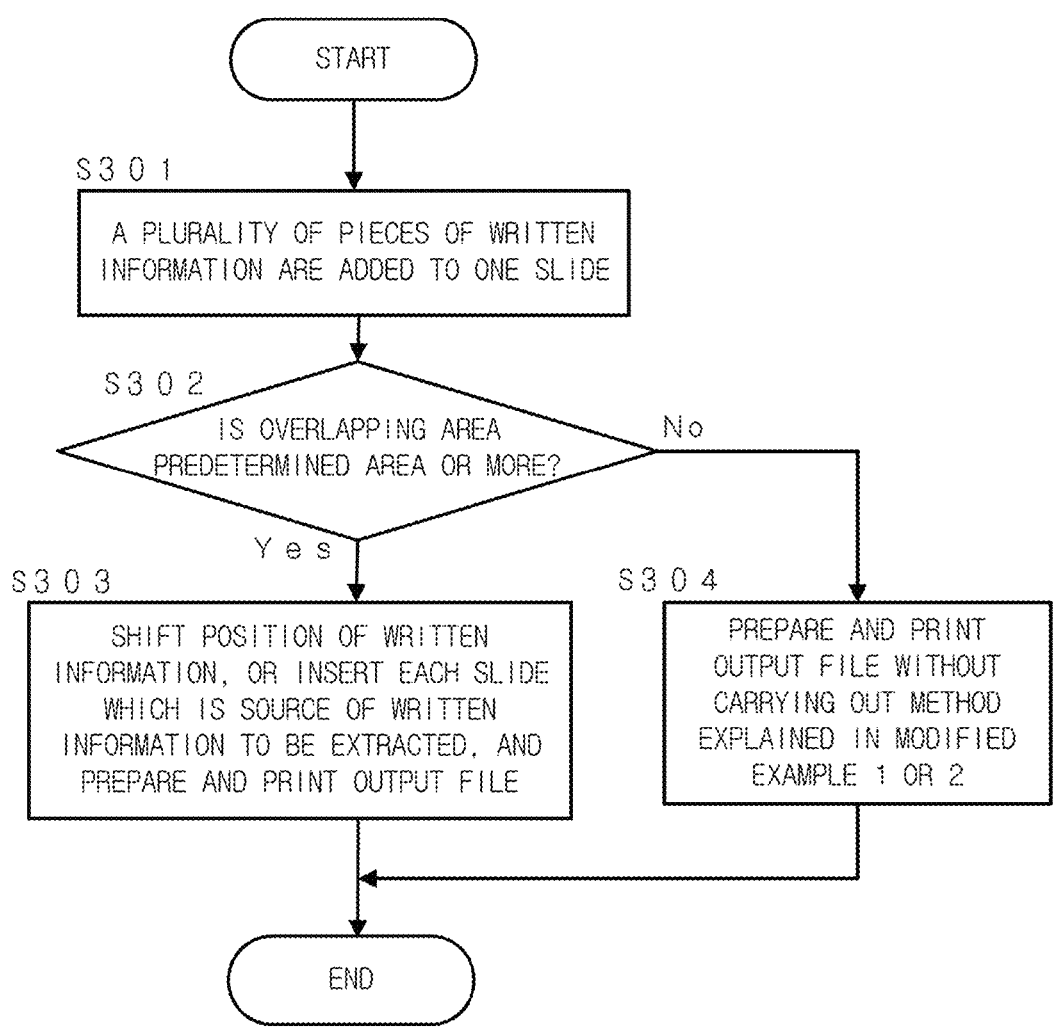
FIG. 22 is a flowchart showing the process which is carried out in case that the output file is prepared in consideration of the modified example 1 or the modified example 2.

FIG. 22 is the flowchart showing the process for preparing the output file in consideration of both of Modified Example 1 and Modified Example 2 in case that the output file is prepared in accordance with the aggregation file and is printed.

Firstly, when it is recognized that a plurality of pieces of the written information which are extracted from different files are added to one slide in the aggregation file (Step S301), it is checked whether the overlapping area is not less than the predetermined area (Step S302).

The method for judging whether the overlapping area is not less than the predetermined area may be carried out, for example, by judging whether the area of the overlapped line is not less than the predetermined area, or by judging whether the center portion of the handwritten contents indicated in the written information is overlapped with the handwritten contents indicated in the other written information. The method for judging whether the overlapping area is not less than the predetermined area is not limited to these, and the suitable method may be adopted.

In case that the overlapping area is not less than the predetermined area (Step S302; Yes), the output file is prepared and printed by carrying out the method described in Modified Example 1 or Modified Example 2 for the slide to which a plurality of pieces of the written information are added (Step S303). Then, the process is ended. In case that the overlapping area is less than the predetermined area (Step S302; No), the output file is prepared and printed without adopting the method described in Modified Example 1 or Modified Example 2 (Step S304). Then, the process is ended.

MODIFIED EXAMPLE 3

Method for Making Written Information Identifiable

In case that written information extracted from the first file and the written information extracted from the second file is aggregated in one slide, there is some possibility that the file from which optional part of the aggregated written information is extracted cannot be easily specified. In Modified Example 3, the output file is prepared so as to indicate the handwritten contents, such as the lines indicated in the written information extracted from the first file and the lines indicated in the written information extracted from the second file, in different colors.

FIG. 23 shows the slide 73 shown in FIG. 6 and the slide 73B in which the written information (draw information 81 and draw information 82) aggregated in the slide 73 is indicated in different colors. In the slide 73B, the color of the lines of the draw information 82 is changed from the color used in the slide 73 to the color which is different from the color of the lines of the draw information 81. Therefore, a user can easily recognize that the draw information 81 and the draw information 82 is written in the different tablet PCs 40.

Figure 24:
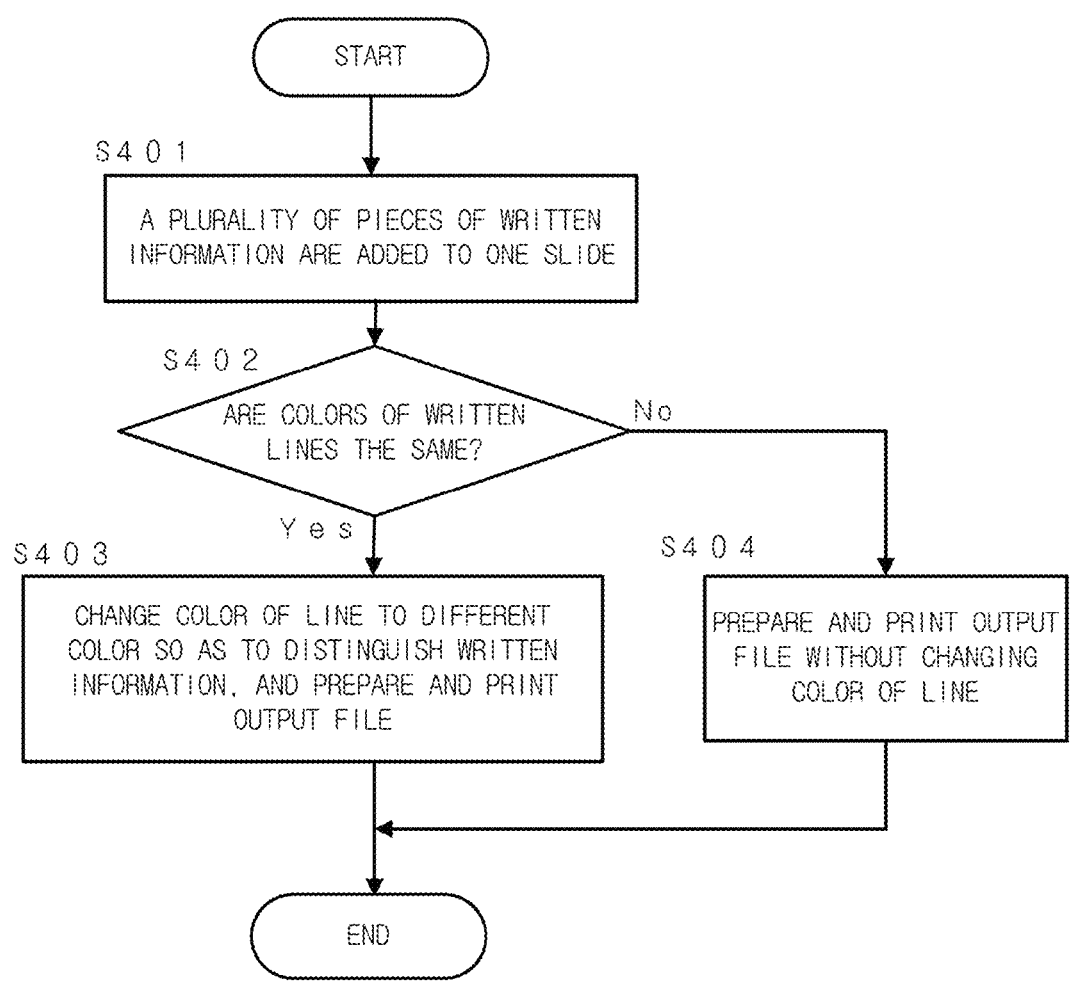
FIG. 24 is a view showing the process which is carried out in case that the output file is prepared so as to aggregate the written information in different line colors.

FIG. 24 is the flowchart showing the process for preparing the output file in consideration of Modified Example 3 in case that the output file is prepared in accordance with the aggregation file and is printed.

Firstly, when it is recognized that a plurality of pieces of the written information which are extracted from different files are added to one slide in the aggregation file (Step S401), it is checked whether the color of the lines of the written information extracted from one file is the same as that of the written information extracted from another file (Step S402).

In case that the color of the lines of the written information extracted from one file is the same as that of the written information extracted from another file (Step S402; Yes), in order to distinguish a plurality of pieces of the written information from one another, the output file is prepared so as to indicate the written information extracted from one file and the written information extracted from another file in different colors and is printed (Step S403). Then, the process is ended.

In case that the color of the lines of the written information extracted from one file is different from that of the written information extracted from another file (Step S402; No), the output file is prepared without changing the color of the lines of the written information, and is printed (Step S404). Then, the process is ended.

MODIFIED EXAMPLE 4

Method for Adding the Identification Information of the File Which is the Source of the Written Information to be Extracted, to the Written Information In Modified Example 4, the identification information of the file which is the source of the handwritten contents to be extracted is indicated near the handwritten contents aggregated in the aggregation file. In this example, because the written information is related to the file which is the source of the above written information, the relation between the file and the written information is used. Specifically, as the identification information of the file which is the source of the written information, the name of the folder in which the written information corresponding to the handwritten contents aggregated in the aggregation file is stored is used.

Figure 25:
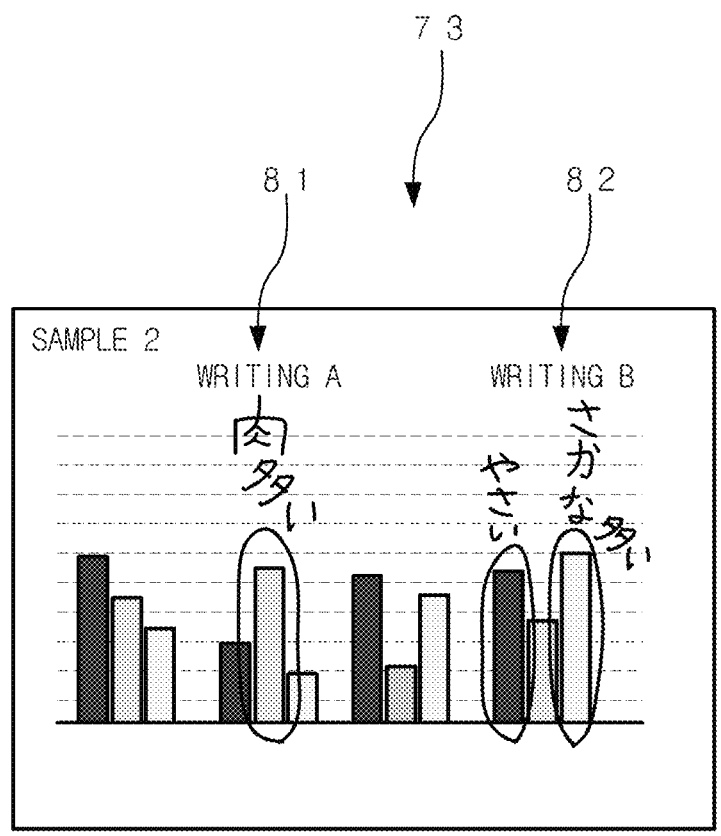
FIG. 25 is a view showing an example of the output file in which the identification information of the file which is the source of the written information to be extracted is added near the handwritten contents indicated in the written information in the modified example 4.

FIG. 25 shows the slide 73 in the output file prepared in accordance with Modified Example 4. In the slide 73 shown in FIG. 25, the identification information (writing A) of the first file which is the source of the draw information 81 is added near the handwritten draw information 81. Further, the identification information (writing B) of the second file which is the source of the draw information 82 is added near the draw information 82. Therefore, a user can easily confirm the file which is the source of the written information to be extracted.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

The file (third file) prepared in the above embodiment may be the aggregation file or the output file obtained by processing the aggregation file.

In this embodiment, the output file prepared in accordance with the aggregation file may be data having an optional format. For example, the output file may be an image file, such as PDF, an OOXML file or the like. In case that the output file is a PDF file, the image forming apparatus 10 may carry out the direct print in accordance with the received output file.

In this embodiment, the aggregation file is prepared, and further, the output file is prepared from the aggregation file. However, the output file may be prepared directly in accordance with the original file, the written information extracted from the first file and the written information extracted from the second file, without preparing the aggregation file.

In this embodiment, the written information is aggregated by extracting the written information from only the first file and the second file. The written information may be extracted and aggregated from three or more files.

In this embodiment, the tablet PC 40 has the function as the handwritten contents aggregation device. The handwritten contents aggregation device is not limited to this, and may be another device. For example, the image forming apparatus 10 may function as the handwritten contents aggregation device. Alternatively, the information processing device having the configuration obtained by extracting the control unit 49, the CPU 41, the ROM 42, the RAM 43 and the communication unit 46 from the tablet PC 40 may be used as the handwritten contents aggregation device. Further, the technology disclosed in the above embodiment may be applied to the program for causing the information processing device to function as the handwritten contents aggregation device.

In this embodiment, the tablet PC 40 has the function as the device for adding the written information indicating the handwritten contents to the original file. However, another device may add the written information to the original file.

In this embodiment, the aggregation file or the output file is prepared by aggregating the handwritten contents added in the specified page (slide) of the first file and the handwritten contents added in the specified page of the second file, which is the same as the above specified page of the first page, in the page of the original file, which corresponds to the above specified pages of the first and the second files. However, the handwritten contents may be aggregated in the page of the original file, which is different from the above specified pages of the first and the second files.

In this embodiment, the file stored in the predetermined folder is the file from which the handwritten contents to be aggregated are extracted. However, the file from which the handwritten contents to be aggregated are extracted may be designated by each user.

One of the objects of the above embodiment is to provide a handwritten contents aggregation device and a non-transitory computer-readable recording medium which can easily aggregate the handwritten contents which are added in the same original file separately by a plurality of devices.

In the embodiment, the written information is extracted from the first file and the second file in which the written information indicating the handwritten contents is added to the same original file, and the third file in which the extracted written information is aggregated is prepared. Therefore, it is possible to easily aggregate the handwritten contents which are added in the same original file separately by a plurality of devices.

The third file may be output data, such as display data, print data or the like. Alternatively, the third file may be an image file, such as a PDF (Portable Document Format) file, a file having the OOXML (Open Office Extensible Markup Language) format.

When the original file originally includes the handwritten contents, in the handwritten contents included in the file from which the handwritten contents to be aggregated are extracted, the handwritten contents which are originally included in the original file are included. Therefore, the difference between the handwritten contents included in the original file and the handwritten contents included in the file from which the handwritten contents to be aggregated are extracted, indicates the handwritten contents which are newly added in the file from which the handwritten contents to be aggregated are extracted. In this embodiment, the third file in which the difference between the written information included in the original file and the written information extracted from the file including the handwritten contents to be aggregated is added to the original file, is prepared.

In this embodiment, the written information is managed so as to relate the written information to the file which is the source of the above written information to be extracted. For example, as the name (folder name) of the storing place for the written information extracted from the first file, the identification information of the first file (such as a part of the file name, which is obtained by removing the common part with the file name of the original file from the file name of the first file) is set. Further, as the name of the storing place for the written information extracted from the second file, the identification information of the second file is set.

In this embodiment, the file name of the file stored in the predetermined place is compared with the file name of the original file. The file having the filename including the file name of the original file is recognized as the file from which the handwritten contents to be aggregated are extracted. For example, the storing place for the original file may be set as the predetermined place.

In this embodiment, the handwritten contents added in the specified page of the first file and the handwritten contents added in the page of the second file, which is the same as the above specified page of the first file, are aggregated in the page of the original file, which is the same as the above specified page. Therefore, a user can easily recognize the portion of the file, in which the handwritten contents are added.

In this embodiment, the third file including the page which is the source of the written information to be extracted is prepared. Therefore, a user can visually recognize the page which is the source of the aggregated written information, by viewing the third file.

In this embodiment, in case that the handwritten contents added in the specified slide of the first file and the handwritten contents added in the slide of the second file, which is the same as the above specified slide of the first file, are aggregated in one page of the original file without changing each position of the handwritten contents in the page, when the overlapping area in which the handwritten contents added in the specified page of the first file are overlapped with the handwritten contents added in the page of the second file is not less than the predetermined area, the third file is prepared by changing (shifting) the position of the handwritten contents in the slide so as to reduce the overlapping area. Therefore, it is possible to secure the visibility of the handwritten contents.

In this embodiment, in case that the handwritten contents added in the specified slide of the first file and the handwritten contents added in the slide of the second file, which is the same as the above specified slide of the first file, are aggregated in one page of the original file without changing each position of the handwritten contents in the page, when the overlapping area in which the handwritten contents added in the specified page of the first file are overlapped with the handwritten contents added in the page of the second file is not less than the predetermined area, the third file including each page from which the written information is extracted is prepared. Therefore, it is possible to confirm the handwritten contents which are overlapped with the handwritten contents indicated in the written information, by viewing each page from which the written information is extracted.

According to the handwritten contents aggregation device and the non-transitory computer-readable recording medium, it is possible to easily aggregate the handwritten contents which are added in the same original file separately by a plurality of devices.

The present U.S. patent application claims the priority of Japanese Patent Application No. 2015-166900, filed on Aug. 26, 2015, according to the Paris Convention, and the entirety of which is incorporated herein by reference for correction of incorrect translation.

What is claimed is:

1. A handwritten contents aggregation device, comprising:
    an obtaining unit configured to obtain a first file and a second file in each of which written information indicating handwritten contents is added to a same original file; and
    a processor configured to:
        analyze the first file and the second file and extract the written information from the first file and the second file;
        prepare a third file by aggregating the written information extracted from the first file and the written information extracted from the second file in the original file;
        output the third file; and
        wherein when the original file includes the written information indicating the handwritten contents, the processor prepares the third file by aggregating a difference between the written information included in the original file and the written information extracted from the first file, and a difference between the written information included in the original file and the written information extracted from the second file, in the original file.

2. The handwritten contents aggregation device of claim 1, wherein the processor prepares the third file in which the first file is related to the written information extracted from the first file and the second file is related to the written information extracted from the second file.

3. The handwritten contents aggregation device of claim 1, wherein the obtaining unit compares a file name of a file stored in a predetermined area with a file name of the original file, and obtains the file having the file name including the file name of the original file as the first file or the second file.

4. The handwritten contents aggregation device of claim 1, wherein the processor prepares the third file by aggregating the handwritten contents added in one page of the first file and the handwritten contents added in the one page of the second file, in the one page of the original file.

5. The handwritten contents aggregation device of claim 1, wherein the processor prepares the third file including a page of the first file, in which the handwritten contents are added, and a page of the second file, in which the handwritten contents are added.

6. The handwritten contents aggregation device of claim 4, wherein in a case that the handwritten contents added in the one page of the first file and the handwritten contents added in the one page of the second file are aggregated in the one page of the original file without changing each position of the handwritten contents in the one page, when an overlapping area in which the handwritten contents added in the one page of the first file are overlapped with the handwritten contents added in the one page of the second file is not less than a predetermined area, the processor prepares the third file by changing the position of the handwritten contents in the one page so as to reduce the overlapping area.

7. The handwritten contents aggregation device of claim 4, wherein in a case that the handwritten contents added in the one page of the first file and the handwritten contents added in the one page of the second file are aggregated in the one page of the original file without changing each position of the handwritten contents in the one page, when an overlapping area in which the handwritten contents added in the one page of the first file are overlapped with the handwritten contents added in the one page of the second file is not less than a predetermined area, the processor prepares the third file including the one page of the first file and the one page of the second file.

8. A non-transitory computer-readable recording medium in which a program is stored, wherein the program causes an information processing device to:
    obtain a first file and a second file in each of which written information indicating handwritten contents is added to a same original file;
    analyze the first file and the second file and extract the written information from the first file and the second file;
    prepare a third file by aggregating the written information extracted from the first file and the written information extracted from the second file in the original file;
    output the third file; and
    wherein when the original file includes the written information indicating the handwritten contents, the program causes the information processing device to prepare the third file by aggregating a difference between the written information included in the original file and the written information extracted from the first file, and a difference between the written information included in the original file and the written information extracted from the second file, in the original file.

9. The non-transitory computer-readable recording medium of claim 8, wherein the program causes the information processing device to prepare the third file in which the first file is related to the written information extracted from the first file and the second file is related to the written information extracted from the second file.

10. The non-transitory computer-readable recording medium of claim 8, wherein the program causes the information processing device to compare a file name of a file stored in a predetermined area with a file name of the original file, and obtain the file having the file name including the file name of the original file as the first file or the second file.

11. The non-transitory computer-readable recording medium of claim 8, wherein the program causes the information processing device to prepare the third file by aggregating the handwritten contents added in one page of the first file and the handwritten contents added in the one page of the second file, in the one page of the original file.

12. The non-transitory computer-readable recording medium of claim 8, wherein the program causes the information processing device to prepare the third file including a page of the first file, in which the handwritten contents are added, and a page of the second file, in which the handwritten contents are added.

13. The non-transitory computer-readable recording medium of claim 11, wherein in a case that the handwritten contents added in the one page of the first file and the handwritten contents added in the one page of the second file are aggregated in the one page of the original file without changing each position of the handwritten contents in the one page, when an overlapping area in which the handwritten contents added in the one page of the first file are overlapped with the handwritten contents added in the one page of the second file is not less than a predetermined area, the program causes the information processing device to prepare the third file by changing the position of the handwritten contents in the one page so as to reduce the overlapping area.

14. The non-transitory computer-readable recording medium of claim 11, wherein in a case that the handwritten contents added in the one page of the first file and the handwritten contents added in the one page of the second file are aggregated in the one page of the original file without changing each position of the handwritten contents in the one page, when an overlapping area in which the handwritten contents added in the one page of the first file are overlapped with the handwritten contents added in the one page of the second file is not less than a predetermined area, the program causes the information processing device to prepare the third file including the one page of the first file and the one page of the second file.

\* \* \* \* \*